(12) United States Patent  (10) Patent No.: US 7,396,032 B2
Horiuchi  (45) Date of Patent: Jul. 8, 2008

(54) BICYCLE HEADSET STRUCTURE

(75) Inventor: Noriyuki Horiuchi, Higashiosaka (JP)

(73) Assignee: Shimano Inc., Osaka (JP)

( * ) Notice: Subject to any disclaimer, the term of this patent is extended or adjusted under 35 U.S.C. 154(b) by 138 days.

(21) Appl. No.: 10/702,605

(22) Filed: Nov. 7, 2003

(65) Prior Publication Data

US 2005/0098979 A1 May 12, 2005

(51) Int. Cl.
*B62K 21/18* (2006.01)
(52) U.S. Cl. .................................... 280/279; 280/276
(58) Field of Classification Search ............... 280/270, 280/276, 279, 278; 74/55.11, 551.1
See application file for complete search history.

(56) References Cited

U.S. PATENT DOCUMENTS

| | | | | |
|---|---|---|---|---|
| 3,295,863 | A * | 1/1967 | Jaulmes | 280/278 |
| 3,785,676 | A * | 1/1974 | Klein, Jr. | 280/279 |
| 3,936,076 | A * | 2/1976 | Probst | 280/276 |
| 4,274,301 | A | 6/1981 | Katayama | |
| 4,310,260 | A | 1/1982 | Katayama | |
| 4,410,197 | A * | 10/1983 | St. Hillaire | 280/279 |
| 4,435,983 | A * | 3/1984 | Shimano | 73/493 |
| 4,489,307 | A | 12/1984 | Nagano | |
| 4,653,768 | A * | 3/1987 | Keys et al. | 280/279 |
| 4,700,963 | A * | 10/1987 | Burns et al. | 280/276 |
| 4,881,750 | A * | 11/1989 | Hartmann | 280/276 |
| 5,095,770 | A | 3/1992 | Rader, III | |
| 5,097,928 | A * | 3/1992 | Enders et al. | 188/300 |
| 5,248,159 | A * | 9/1993 | Moore | 280/276 |
| 5,272,936 | A * | 12/1993 | Nagano | 74/551.1 |
| 5,305,654 | A * | 4/1994 | Durham | 74/551.1 |
| 5,319,993 | A | 6/1994 | Chiang | |
| 5,330,220 | A | 7/1994 | Nagano | |
| 5,496,126 | A | 3/1996 | Lin | |
| 5,647,684 | A | 7/1997 | Chen | |
| 5,681,119 | A | 10/1997 | Marui | |
| 5,687,616 | A * | 11/1997 | Marui | 74/551.1 |
| 5,800,071 | A | 9/1998 | Chi | |
| 5,826,898 | A | 10/1998 | Fortier et al. | |
| 5,893,574 | A * | 4/1999 | Campagnolo | 280/279 |
| 5,918,895 | A | 7/1999 | Chi | |
| 5,927,740 | A * | 7/1999 | Hopey | 280/272 |
| 5,971,116 | A * | 10/1999 | Franklin | 188/282.4 |
| 6,019,017 | A | 2/2000 | Lin | |
| 6,145,637 | A * | 11/2000 | Hopey | 188/306 |
| 6,149,174 | A * | 11/2000 | Bohn | 424/49 |
| 6,167,780 | B1 | 1/2001 | Chen | |
| 6,343,806 | B1 | 2/2002 | Lee | |
| 6,416,071 | B2 | 7/2002 | Marui | |
| 6,431,575 | B2 * | 8/2002 | Campagnolo | 280/279 |
| 6,543,799 | B2 | 4/2003 | Miyoshi | |
| 6,612,599 | B2 | 9/2003 | Miyoshi | |
| 2003/0140727 | A1 | 7/2003 | Chuang | |
| 2003/0230228 | A1 | 12/2003 | Kinoshita | |
| 2005/0057017 | A1* | 3/2005 | Hara et al. | 280/279 |

FOREIGN PATENT DOCUMENTS

JP 62-40868 U 10/1987

* cited by examiner

*Primary Examiner*—Lesley D. Morris
*Assistant Examiner*—Daniel Yeagley
(74) *Attorney, Agent, or Firm*—Global IP Counselors, LLP

(57) ABSTRACT

A bicycle headset structure is provided to aid in the mounting of a steerer tube of a front fork to a head tube of a bicycle frame. The bicycle headset structure is configured such that a device can be mounted in the steerer tube and the headset is appropriately loaded.

12 Claims, 15 Drawing Sheets

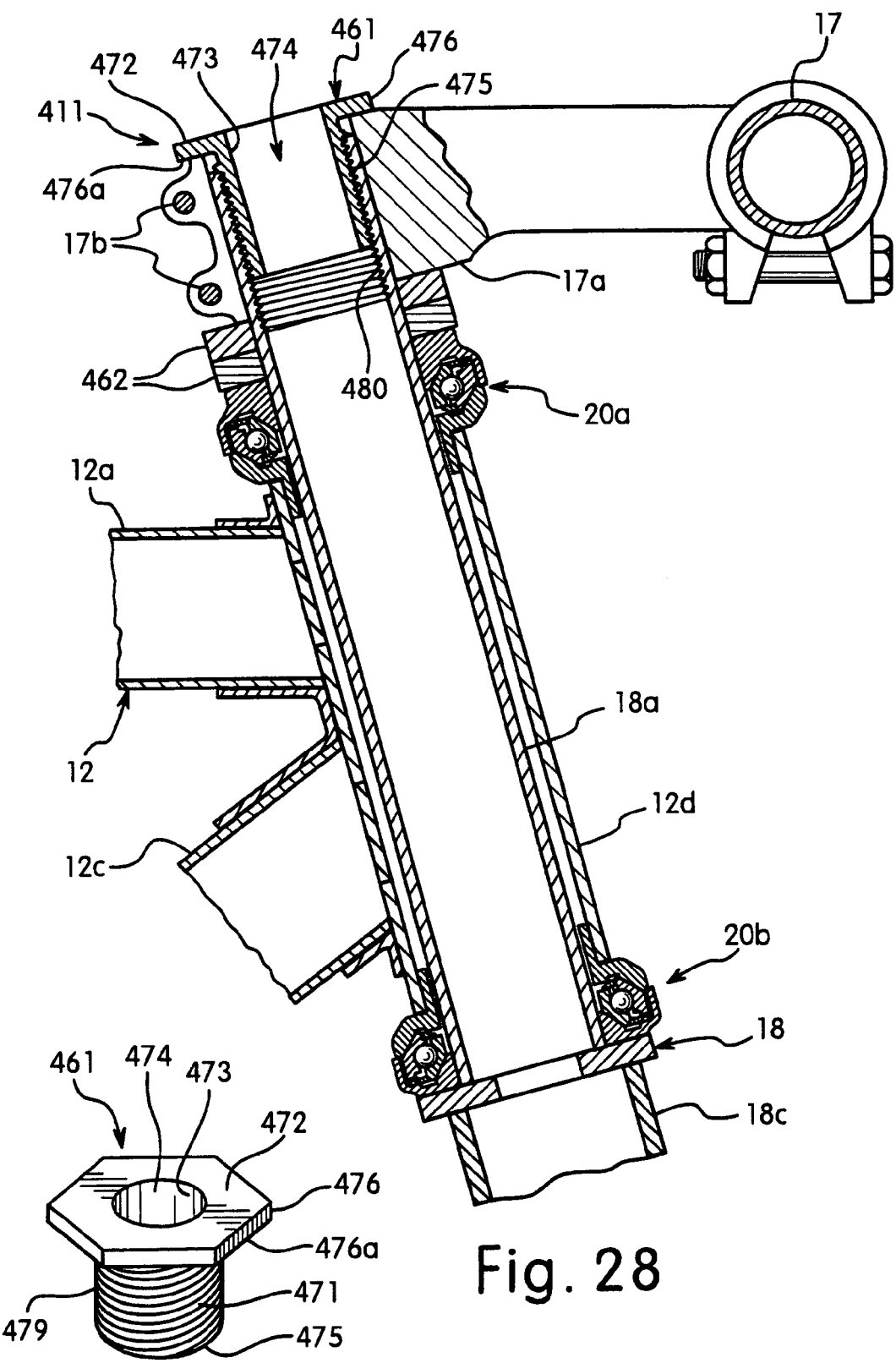

BICYCLE HEADSET STRUCTURE

BACKGROUND OF THE INVENTION

1. Field of the Invention

This invention generally relates to a bicycle headset structure for a bicycle. More specifically, the present invention relates to a bicycle headset structure configured to apply an axial force to a headset that rotatably mounts a steerer tube of a front fork to a head tube of a bicycle frame.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle as well as the frame of the bicycle.

Recently, bicycles have been equipped with electrical components to make riding easier and more enjoyable for the rider. Some bicycles are equipped with computer controlled suspensions that are automatically adjusted according to the riding conditions by a cycle computer or control unit. An example of a computer controlled suspension is disclosed in U.S. Pat. No. 6,543,799, which is assigned to Shimano, Inc. Moreover, many new bicycles have automatic shifting units that are automatically adjusted according to the riding conditions by a cycle computer or control unit.

Accordingly, these bicycles with electrical components need to be equipped with control devices for controlling the various electrical components and one or more batteries for supplying electrical power to the various electrical components. Unfortunately, there is a limited amount of space on a bicycle frame to mount all of these electronic components such that the rider has access to the electronic components. In other words, these electronic components are preferably mounted in particular areas of the bicycle such as the handlebar, which further limits the mounting areas for the electronic components. Also it is desirable to mount the electronic components in such a manner as to be attractive and easy to use. Thus, it is desirable to mount the electronic components in such a manner that the wire does not interfere with the operation of the bicycle and the wire does not detract from the appearance of the bicycle.

In view of the above, it will be apparent to those skilled in the art from this disclosure that there exists a need for an improved bicycle headset structure. This invention addresses this need in the art as well as other needs, which will become apparent to those skilled in the art from this disclosure.

SUMMARY OF THE INVENTION

One object of certain embodiments of the present invention is to provide a bicycle headset structure that is configured to apply an axial force to a headset used to rotatably mount a steerer tube of a front fork to a head tube of a bicycle frame.

Another object of certain embodiments of the present invention is to provide a bicycle headset structure that can be used to mount an electrical device or part in a steerer tube of a bicycle fork.

Another object of certain embodiments of the present invention is to provide a bicycle headset structure that provides an unobstructed passageway or channel through the head tube of the bicycle frame for passing wires from components mounted in the handlebar area to components mounted on the rest of the bicycle.

Another object of certain embodiments of the present invention is to provide a bicycle headset structure that can be used to mount an electrical device or part in a steerer tube of a bicycle fork.

Another object of certain embodiments of the present invention is to provide a bicycle headset structure that is relatively inexpensive to manufacture and relatively simple to install.

The foregoing objects can basically be attained by providing a bicycle headset structure that basically comprises a tubular section, a top abutment section and a steerer tube attachment section. The tubular section has a first end with an upper end opening, and an axial passageway extending axially from the first end towards a second end of the tubular section. The top abutment section extends radially from the tubular section to form an abutment surface that faces in an axial direction towards the second end of the tubular section. The steerer tube attachment section is configured and arranged to adjustably couple the tubular section to a steerer tube such that selective adjustment of the steerer tube attachment section results in the abutment surface applying a downward force on a bicycle head tube to hold the steerer tube within the bicycle head tube.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 28 is a partial enlarged side cross-sectional view of a top portion of the front suspension fork illustrated in FIG. 1 with the bicycle headset structure installed thereon in accordance with a fourth embodiment of the present invention;

FIG. 29 is a perspective view of the upper or top tubular member of the bicycle headset structure illustrated in FIG. 28 in accordance with the fourth embodiment of the present invention;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
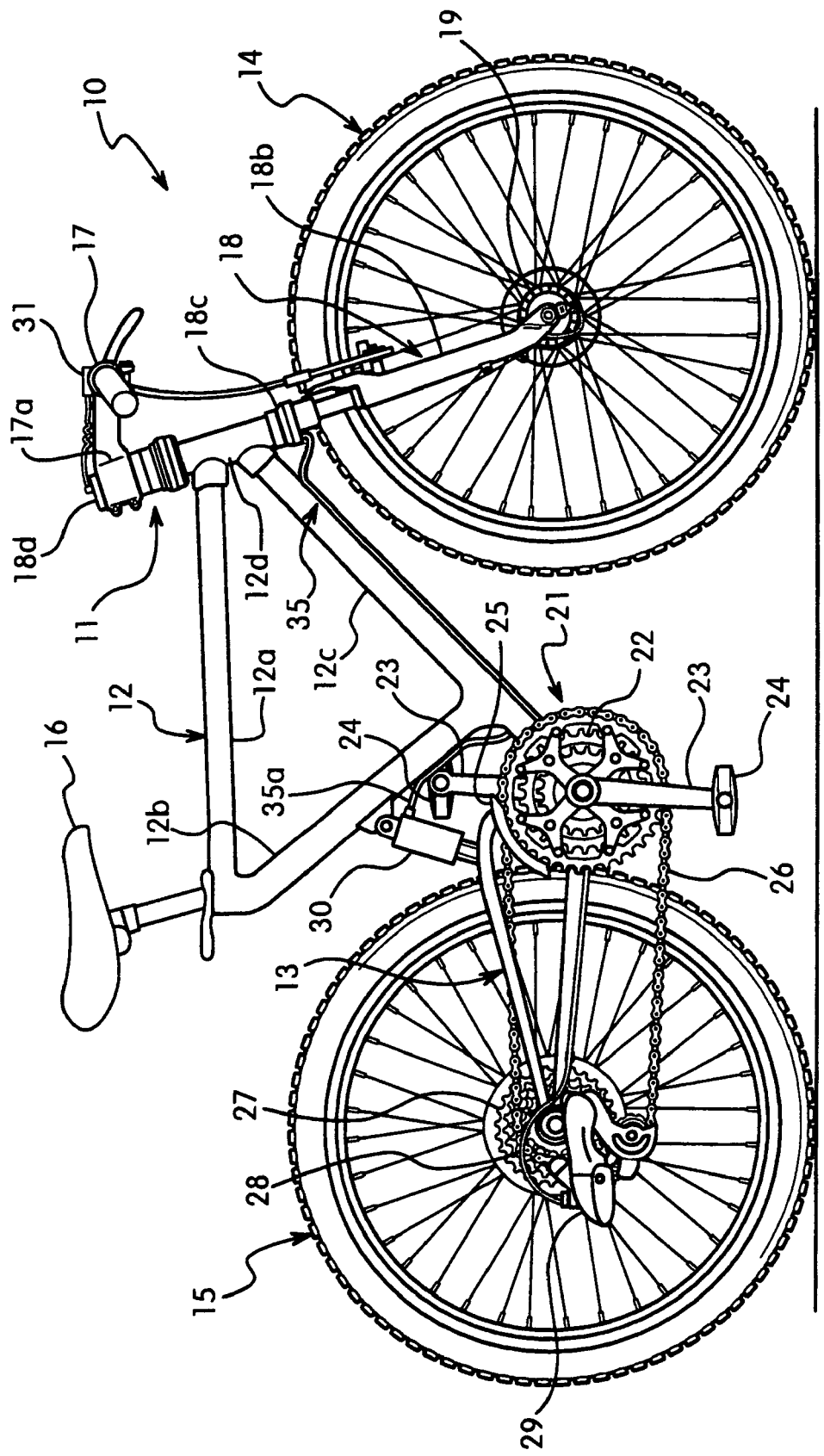
FIG. 1 is a side elevational view of a bicycle that is equipped with a bicycle headset structure in accordance with a first embodiment of the present invention.

Referring initially to FIG. 1, a bicycle 10 is illustrated that is equipped with a bicycle headset structure 11 and various electronic components in such a manner as to carryout a first embodiment of the present invention as discussed below. Bicycles and their various components are well known in the art, and thus, bicycle 10 and its various components will not be discussed and/or illustrated in detail herein, except for the components that relate to the present invention. Also as used herein, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention.

As seen in FIG. 1, the bicycle 10 basically includes a main frame 12, a rear chain stay 13, a front wheel 14 and a rear wheel 15. The main frame 12 is also equipped with a seat 16, a handlebar 17 and a front suspension fork 18 that rotatably supports the front wheel 14 via a front dynamo hub 19 of the front wheel 14. The main frame 12 basically includes a top tube 12a, a seat tube 12b, a down tube 12c and a head tube 12d.

Figure 2:
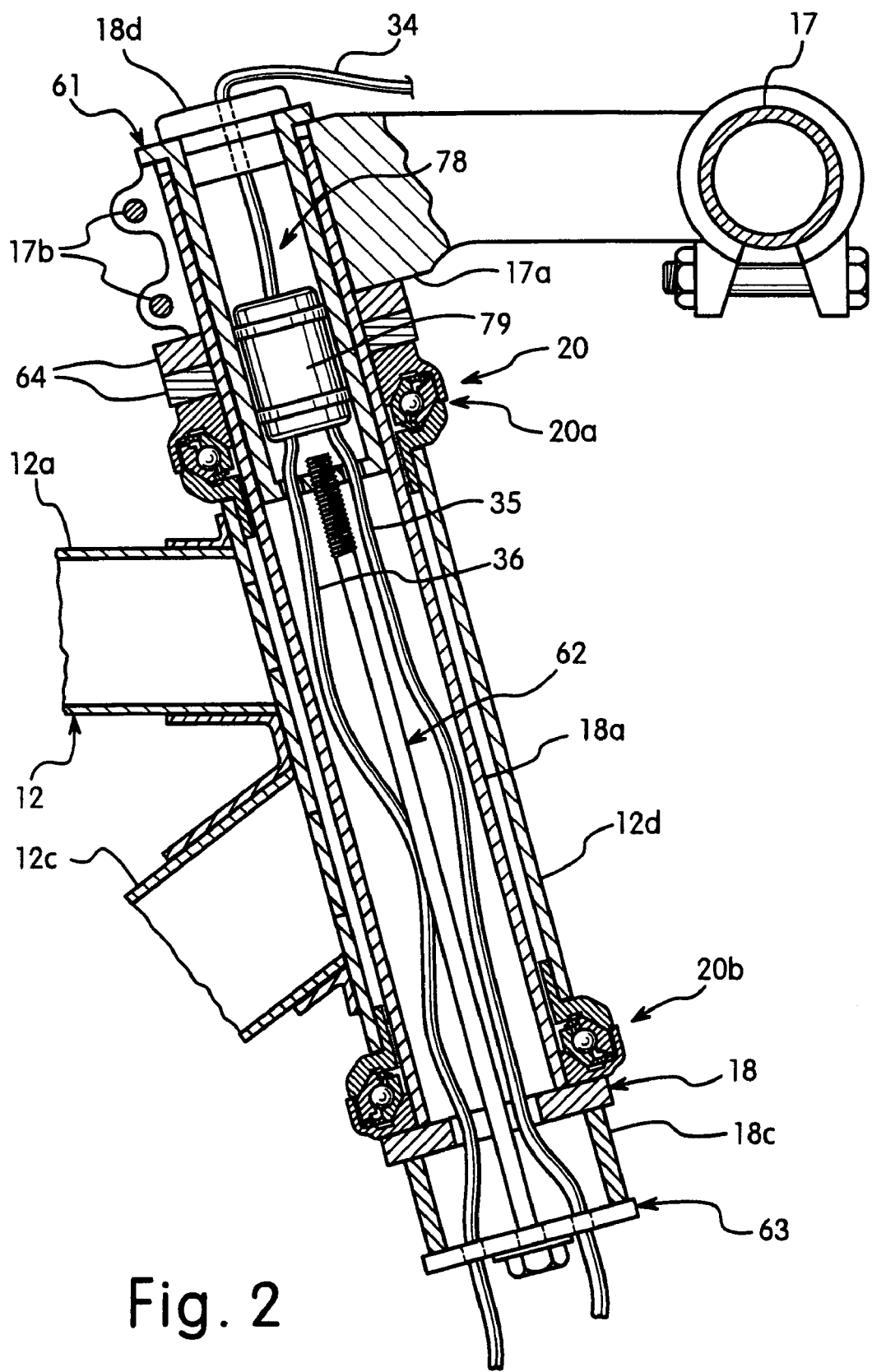
FIG. 2 is a partial enlarged side cross-sectional view of a top portion of the front suspension fork with the bicycle headset structure illustrated in FIG. 1 in accordance with the first embodiment of the present invention.

As seen in FIGS. 1 and 2, an upper end of the front suspension fork 18 is movably coupled to the head tube 12d of the main frame 12, while the lower end of the front suspension fork 18 is coupled to the front dynamo hub 19. The front suspension fork 18 basically includes a steerer tube 18a rotatably mounted in the head tube 12d of the main frame 12 by a headset 20, a pair of telescoping struts 18b that are interconnected by an upper crown 18c which is coupled to the steerer tube 18a. Thus, the front wheel 14 is rotatably mounted to the front suspension fork 18 by the front dynamo hub 19 in conventional manner. Thus, the handlebar 17 is fixed to the front suspension fork 18 for turning the front suspension fork 18 and the front wheel 14 relative to the main frame 12.

Optionally, a wiring cap 18d is inserted in the upper end of the steerer tube 18a for sealing off the upper end of the steerer tube 18a. Preferably, the wiring cap 18d has one or more bores for receiving one or more electrical cords therethrough. In this embodiment, the wiring cap 18d is a plastic or rubber cap that is frictionally retained in the steerer tube 18a.

The front suspension fork 18 is preferably an electronically controlled suspension that includes an electric dampening device (not shown) that changes the dampening characteristics of the front suspension fork 18. Since the precise structure of the electric dampening device is not important to the present invention, the precise structure of the electric dampening device will not be discussed or illustrated in detail herein. An example of an electronically controlled front suspension is the front suspension of the Nexave C-910 components that are sold by Shimano Inc.

As seen in FIG. 2, the handlebar 17 has a mounting portion 17a that is fixed to the front suspension fork 18 by with a pair of bolts 17b in a conventional manner. Thus, the handlebar 17 is fixed to the front suspension fork 18 for turning the front suspension fork 18 and the front wheel 14 relative to the main frame 12.

As also seen in FIG. 2, the headset 20 includes an upper steering bearing set 20a and a lower steering bearing set 20b. The headset 20 is a relatively conventional part of a bicycle. Thus, the headset 20 will not be discussed or illustrated in detail herein.

The handlebar 17 is fixed to the steerer tube 18a of the front suspension fork 18 by the mounting portion 17a. In particular, the mounting portion 17a of the handlebar 17 is a tube clamp in which the inner diameter of the mounting bore decreases upon the tightening of the bolts 17b. In the present invention, the bicycle headset structure 11 is mounted within the steerer tube 18a of the front suspension fork 18 so as to contact the upper surface of the mounting portion 17a of the handlebar 17 and the lower surface of the upper crown 18c of the front suspension fork 18. Before the mounting portion 17a of the handlebar 17 is fixedly clamped (i.e., loosely installed) to the steerer tube 18a, the bicycle headset structure 11 is adjusted to apply an axial force that pulls the mounting portion 17a of the handlebar 17 and the front suspension fork 18 together to load the headset 20. In particular, the bicycle headset structure 11 is configured and arranged to contract in an axial direction on the steerer tube 18a to apply an axial force to the headset 20 and secure the steerer tube 18a of the front suspension fork 18 within the head tube 12d. This axial force on the headset 20 allows the user to apply to appropriate load to the upper and lower steering bearing sets 20a and 20b.

Referring back to FIG. 1, the rear chain stay 13 is pivotally coupled to the main frame 12 by a bottom bracket (not shown). A drive train 21 is also operatively coupled between the main frame 12 and the rear chain stay 13 in a conventional manner. The drive train 21 basically includes a plurality of front chain rings or sprockets 22 mounted on a bottom bracket (not shown), a pair of crank arms 23 with a pair of pedals 24, a front derailleur 25 mounted on the bottom bracket (not shown), a drive chain 26, a plurality of rear sprockets 27 coupled to a rear hub 28 of the rear wheel 15 in a conventional manner, and a rear derailleur 29 mounted to the rear chain stay 13. Since these parts of bicycle 10 are well known in the art, these parts will not be discussed or illustrated in detail herein, except as they are modified to be used in conjunction with the present invention. Moreover, various conventional bicycle parts such as brakes, etc., which are not illustrated and/or discussed herein, are also used in conjunction with the present invention as needed and/or desired.

As seen in FIG. 1, a rear suspension unit 30 is operatively coupled between the main frame 12 and the rear chain stay 13 to absorb shocks transmitted to the rear wheel 15. The rear suspension unit 30 is an electronically controlled suspension that includes an electric dampening device (not shown) that changes the dampening characteristics of the rear suspension unit 30. Since the precise structure of the electric dampening device is not important to the present invention, the precise structure of the electric dampening device will not be discussed or illustrated in detail herein. An example of an electronically controlled rear suspension is the rear suspension of the Nexave C-910 components that are sold by Shimano Inc.

Figure 3:
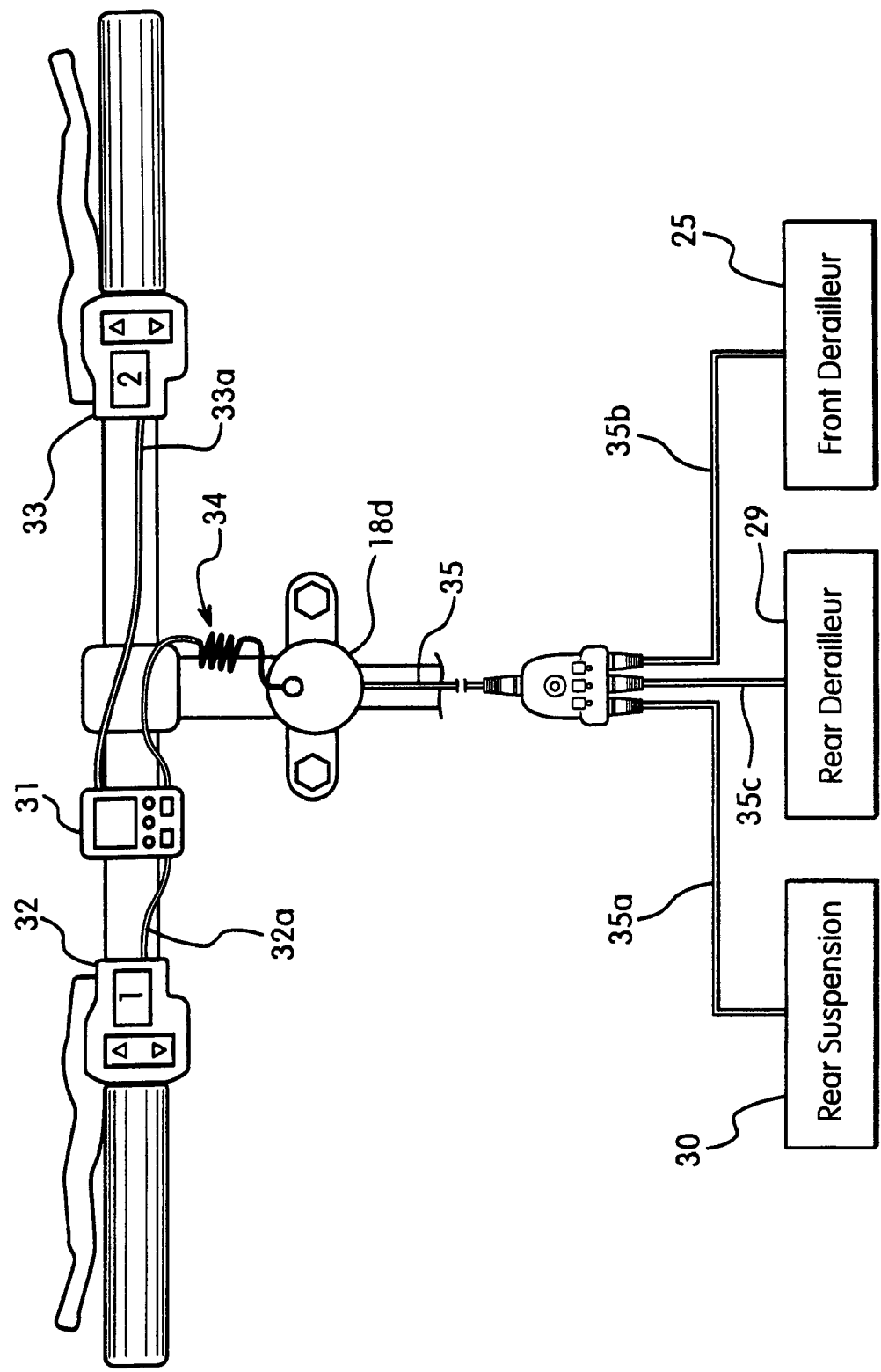
FIG. 3 is a partial top plan view of a front portion of the bicycle illustrated in FIG. 1, which illustrates the various components coupled to the bicycle.

As seen in FIG. 3, the bicycle 10 is equipped with various electronic control components that are mounted on the handlebar 17. In particular, the bicycle 10 is equipped with a cycle computer 31, a front electronic shifting unit 32 and a rear electronic shifting unit 33. The cycle computer 31 is electrically coupled to various electronic components including, but not limited to, the front dynamo hub 19, the front electronic shifting unit 32, the rear electronic shifting unit 33, the front electric dampening device and the rear electric dampening device. The cycle computer 31 is preferably electrically coupled to these various electronic components by an electrical cord 34 that splits into several feed wires or cord portions (only two electrical cords 35 and 36 will be illustrated in FIG. 2 for the sake of simplicity and for easy of illustration) that each includes a plurality of electrical conductors. Examples of various electronic control components that can be used with the present invention are the Nexave C-910 components that are sold by Shimano Inc.

The cycle computer 31 includes a plurality of push buttons for operating the automatic shifting control and the automatic suspension control. In the illustrated embodiment, as seen in FIG. 2, the cycle computer 31 is electrically coupled to the front electronic shifting unit 32 and the rear electronic shifting unit 33 by electrical cords 32a and 33a, respectively. The cycle computer 31 is preferably configured and arranged with control programs stored for controlling the automatic suspension and the automatic shifting based on the rider input commands and/or riding conditions from sensors (not shown). Alternatively, the cycle computer 31 preferably includes a microcomputer with a control program that controls the automatic shifting control and the automatic suspension control. The cycle computer 31 can also include other conventional components such as an input interface circuit, an output interface circuit, and storage devices such as a ROM (Read Only Memory) device and a RAM (Random Access Memory) device. The microcomputer of the cycle computer 31 is programmed to display various information such as the status of the various components as well as programmed to control automatic shifting control and the automatic suspension control. The memory circuit stores processing results and control programs that are run by the processor circuit.

Referring back to FIG. 2, the electrical cord 35 that extends from the electrical cord 34 electrically couples the cycle computer 31 to the electric dampening device of the rear suspension unit 30, the front derailleur 25 and the rear derailleur 29 thereto.

Preferably, as seen in FIG. 3, the electrical cord 35 splits into several feed wires or cord portions that includes an electrical cord portion 35a electrically coupled to the electric dampening device of the rear suspension unit 30, an electrical cord portion 35b electrically coupled to an electric device of the front derailleur 25, and an electrical cord portion 35c electrically coupled to the rear derailleur 29. Accordingly, each of these cord portions 35a-35c includes a plurality of electrical conductors.

The electrical cord 36 that extends from the electrical cord 34 electrically couples the cycle computer 31 to the electric dampening device of the front suspension fork 18 and the front dynamo hub 19. Preferably, the electrical cord 36 splits into several feed wires or cord portions that include a plurality of electrical conductors.

Since the precise structure of the electrical cords 34, 35 and 36 as well as their various electrical connections are not important to the present invention, the precise structure of the electrical cords 34, 35 and 36 as well as their various electrical connections will not be discussed or illustrated in detail herein. In fact, the structure of the electrical cords 34, 35 and 36 as well as their various electrical connections have been illustrated in a simplified manner for the sake of simplicity and for easy of illustration. Moreover, the construction of the electrical cords 34, 35 and 36 as well as their various electrical connections will depend upon the number and type of electrical components that are connected to the cycle computer 31.

The front shifting unit 32 includes a plurality of shifting push buttons for manually shifting the front derailleur 25 when the cycle computer 31 has been set by the rider to a manual mode. In the illustrated embodiment, as seen in FIG. 2, the front shifting unit 32 is electrically coupled to the cycle computer 31 by the electrical cord 32a. In the preferred embodiment, the front shifting unit 32 inputs electrical commands to the cycle computer 31.

The rear shifting unit 33 includes a plurality of shifting push buttons for manually shifting the rear derailleur 29 when the cycle computer 31 has been programmed or set by the rider to a manual mode. In the illustrated embodiment, the rear shifting unit 33 is electrically coupled to the cycle computer 31 by the electrical cord 33a. In the preferred embodiment, the rear shifting unit 33 inputs electrical commands to the cycle computer 31.

Figure 4:
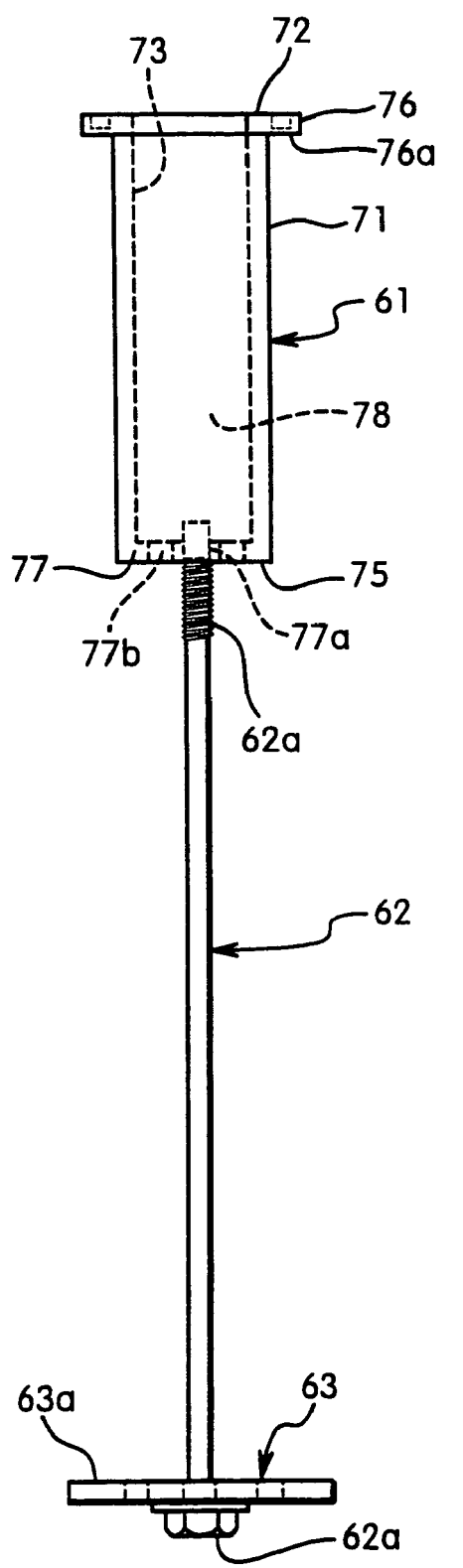
FIG. 4 is a side elevational view of the bicycle headset structure illustrated in FIG. 2 in accordance with the first embodiment of the present invention.
Figure 5:
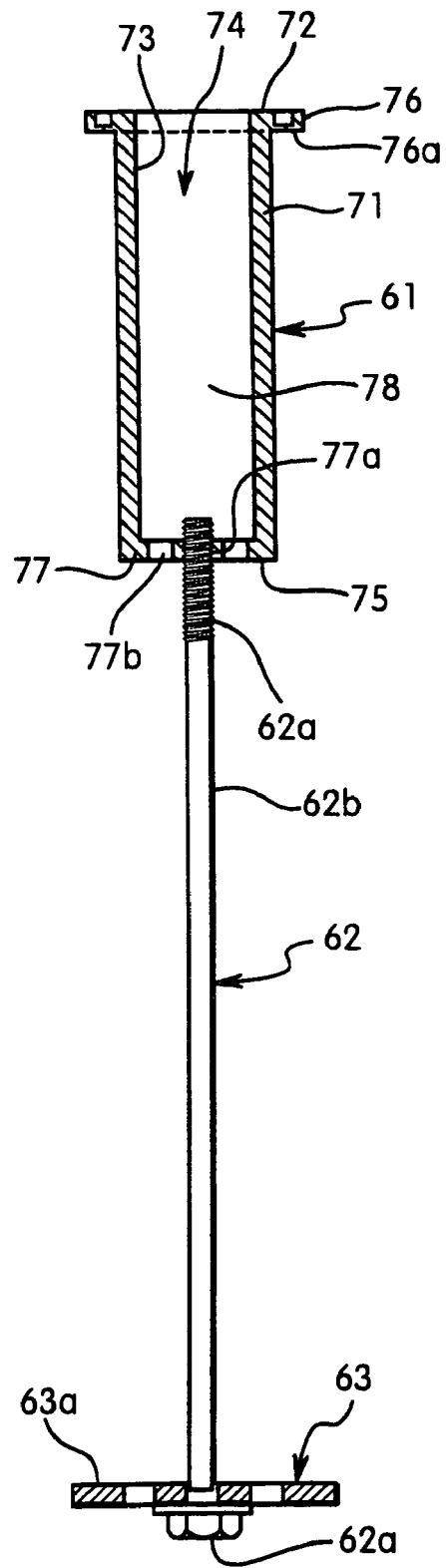
FIG. 5 is a longitudinal cross-sectional view of the bicycle headset structure illustrated in FIG. 4 in accordance with the first embodiment of the present invention.

Turning now to FIGS. 2, 4 and 5, the bicycle headset structure 11 is coupled to the steerer tube 18a of the front suspension fork 18 in accordance with the first embodiment of the present invention. The bicycle headset structure 11 basically includes an upper tubular member 61, a tightening bolt 62, and a bottom washer or abutment member 63. In this embodiment, the bicycle headset structure 11 also includes a pair of spacers or washers 64 that located on the steerer tube 18a between the mounting portion 17a of the handlebar 17 and the upper steering bearing set 20a of the headset 20.

In the present invention, the bicycle headset structure 11 is mounted within the steerer tube 18a of the front suspension fork 18 so as to contact the upper surface of the mounting portion 17a of the handlebar 17 and the lower surface of the upper crown 18c of the front suspension fork 18. Before the mounting portion 17a of the handlebar 17 is fixedly clamped (i.e., loosely installed) to the steerer tube 18a, the bicycle headset structure 11 is adjusted to apply an axial force that pulls the mounting portion 17a of the handlebar 17 and the front suspension fork 18 together to load the headset 20. In particular, the bicycle headset structure 11 is configured and arranged to contract in an axial direction on the steerer tube 18a to apply an axial force to the headset 20 and secure the steerer tube 18a of the front suspension fork 18 within the head tube 12d. Thus, the bicycle headset structure 11 is configured and arranged to exert a downward pressure or force on the mounting portion 17a of the handlebar 17 and the spacers 64 which in turn exert a downward pressure or axial force of the upper and lower steering bearing sets 20a and 20b. This axial force on the headset 20 allows the used to apply to appropriate load to the upper and lower steering bearing sets 20a and 20b.

Figure 6:
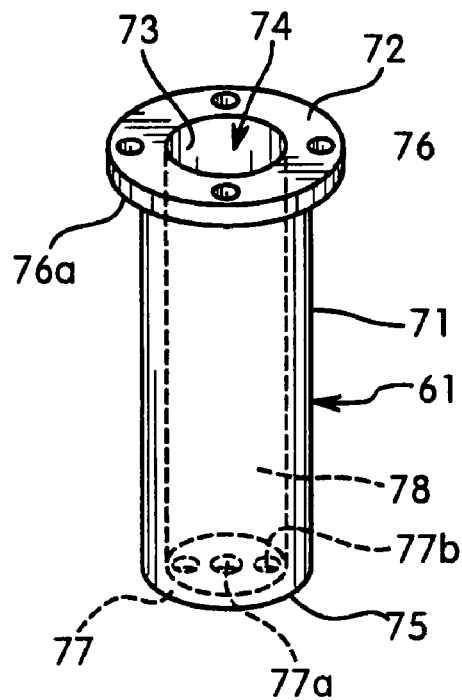
FIG. 6 is a perspective view of the first (top) tubular member or spacer of the bicycle headset structure illustrated in FIGS. 4 and 5 in accordance with the first embodiment of the present invention.

As seen in FIGS. 4-6, the upper tubular member 61 is preferably constructed as a one-piece, unitary member from a hard rigid material. More preferably, the upper tubular member 61 is constructed of a metallic material suitable for bicycles. The upper tubular member 61 basically includes a tubular section 71 having a first end 72 with an upper end opening 73, and an axial passageway 74 extending axially from the first end 72 towards a second end 75 of the tubular section 71.

The first end 72 of the tubular section 71 has an annular flange 76 that extends radially outwardly from the tubular section 71. In other words, the annular flange 76 forms a top abutment section that extends radially from the tubular section 76 to form an abutment surface 76a that faces in an axial direction towards the second end 75 of the tubular section 71. Preferably, the abutment surface 76a is substantially annularly arranged about the first end 75 of the tubular section 71. In other words, the abutment surface 76a is preferably a continuous annular flange. Of course, it will be apparent to those skilled in the art from this disclosure that the abutment surface 76a can be a discontinuous annular flange. The tubular section 71, except for the annular flange 76, has an outer width or diameter that is sized to be received with in the passageway of the steerer tube 18a. The annular flange 76, on the other hand, has an outer width or diameter that is sized to be larger than the outer width or diameter of the steerer tube 18a such that the annular flange 76 abuts against the mounting portion of the handlebar 17.

As seen in FIGS. 2, 4, 5 and 6, the second end 75 of the tubular section 71 has a lower end wall 77 that is axially spaced from the upper end opening along the axial passageway 74 of the tubular section 71 to form a device receiving space 78. In this embodiment, an electrical device 79 is inserted into the device receiving space 78. Of course, it will be apparent to those skilled in the art from this disclosure that other device can be inserted therein (See FIGS. 29-32). The lower end wall 77 has an internally threaded hole 77a with a set of first threads for threadedly engaging the tightening bolt 62. Optionally, the lower end wall 77 has one or more apertures 77b for one or more wires to extend through the lower end wall 77 as seen in FIG. 2.

Figure 7:
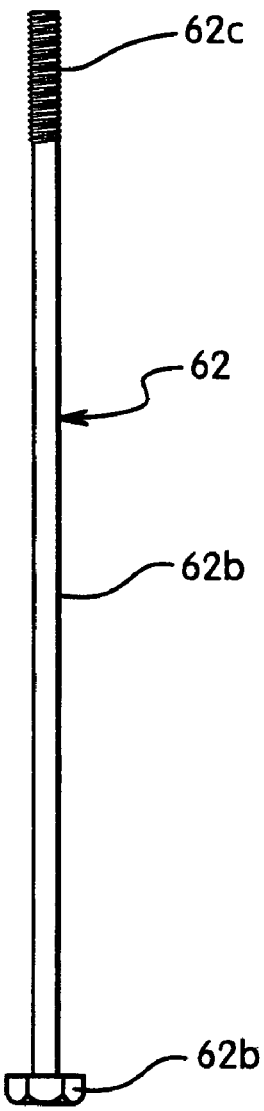
FIG. 7 a side elevational view of the tightening bolt of the bicycle headset structure illustrated in FIGS. 4 and 5 in accordance with the first embodiment of the present invention.

As seen in FIGS. 4, 5 and 7, the tightening bolt 62 has a head portion 62a and a threaded shaft portion 62b with a set of second threads 62c. The second threads 62c of the threaded shaft portion 62b are threadedly engaged with the first threads of threaded hole 77a of the upper tubular member 61. The tightening bolt 62 is preferably constructed as a one-piece, unitary member from a hard rigid material. More preferably, the tightening bolt 62 is constructed of a metallic material that is especially suitable for bicycles.

Figure 8:
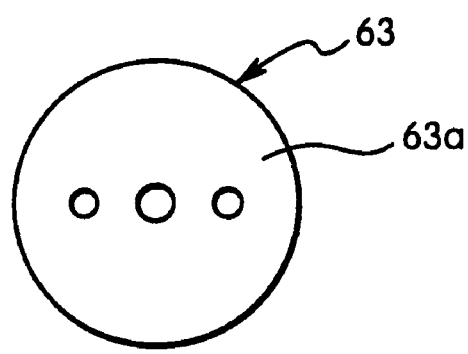
FIG. 8 is a side elevational view of the bottom washer or abutment member of the bicycle headset structure illustrated in FIGS. 4 and 5 in accordance with the first embodiment of the present invention.

As seen in FIGS. 4, 5 and 8, the bottom washer 63 is preferably constructed as a one-piece, unitary member from a hard rigid material. More preferably, the bottom washer 63 is constructed of a metallic material that is especially suitable for bicycles. Of course, it will be apparent to those skilled in the art from this disclosure that the tightening bolt 62 and the bottom washer 63 can be constructed together as a one-piece, unitary member from a hard rigid material or two separate members that are fixedly coupled together. In any event, the head portion 62a together with the bottom washer 63 form an abutment surface 63a with a radial width that is larger than a radial width of the tubular section 71. Thus, the abutment surface 63a contacts the lower end of the bicycle head tube 12d.

As seen in FIGS. 4 and 5, the tightening bolt 62 and the bottom washer 63 form a steerer tube attachment section of the bicycle headset structure 11, with the abutment surface 63a being a lower abutment of the steerer tube attachment section. Thus, the steerer tube attachment section is configured and arranged to adjustably couple the tubular section 71 to the steerer tube 18a such that selective adjustment of the steerer tube attachment section results in the abutment surface 76a of the annular flange 76 applies a downward force on the bicycle head tube 12d to hold the steerer tube 18a within the bicycle head tube 12d.

Second Embodiment

Referring now to FIGS. 9-17, a bicycle headset structure 211 in accordance with a second embodiment will now be explained. The bicycle headset structure 211 is installed on the steerer tube 18a of the front suspension fork 18 of the bicycle 10. In other words, the bicycle headset structure 211 replaces the bicycle headset structure 11. Accordingly, in this second embodiment of the present invention, the bicycle headset structure 211 is mounted within the steerer tube 18a of the front suspension fork 18 to hold the steerer tube 18a within the bicycle head tube 12d. In particular, the bicycle headset structure 211 is mounted within the steerer tube 18a of the front suspension fork 18 so as to contact the upper surface of the mounting portion 17a of the handlebar 17 and the lower surface of the upper crown 18c of the front suspension fork 18. Before the mounting portion 17a of the handlebar 17 is fixedly clamped (i.e., loosely installed) to the steerer tube 18a, the bicycle headset structure 211 is adjusted to apply an axial force that pulls the mounting portion 17a of the handlebar 17 and the front suspension fork 18 together to load the headset 20. In particular, the bicycle headset structure 211 is configured and arranged to contract in an axial direction on the steerer tube 18a to apply an axial force to the headset 20 and secure the steerer tube 18a of the front suspension fork 18 within the head tube 12d. Thus, the bicycle headset structure 211 is configured and arranged to exert a downward pressure or force on the mounting portion 17a of the handlebar 17 which in turn exert a downward pressure or axial force of the upper and lower steering bearing sets 20a and 20b. This axial force on the headset 20 allows the user to apply to appropriate load to the upper and lower steering bearing sets 20a and 20b.

Figure 9:
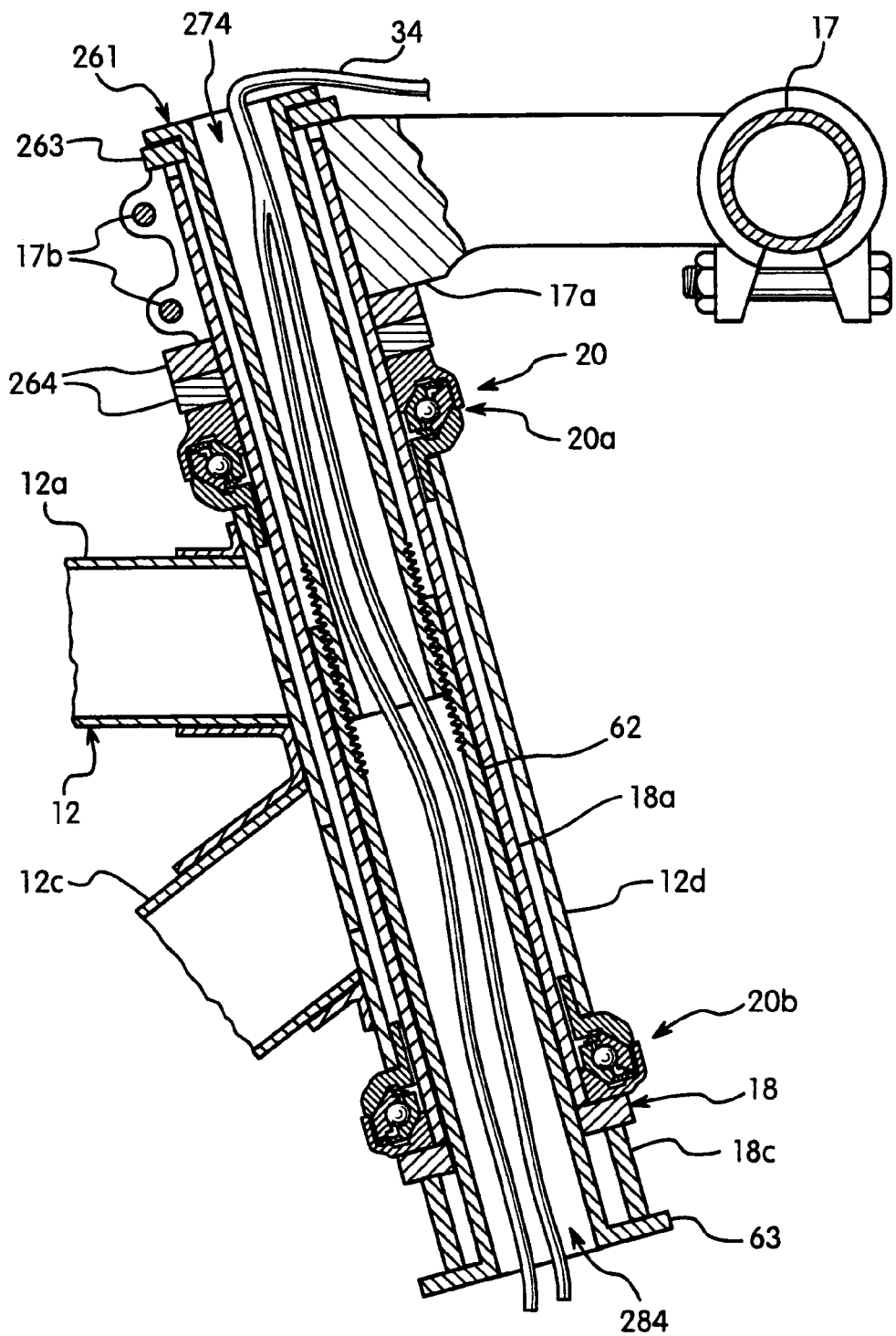
FIG. 9 is a partial enlarged side cross-sectional view of a top portion of the front suspension fork illustrated in FIG. 1 with the bicycle headset structure installed thereon in accordance with a second embodiment of the present invention.
Figure 10:
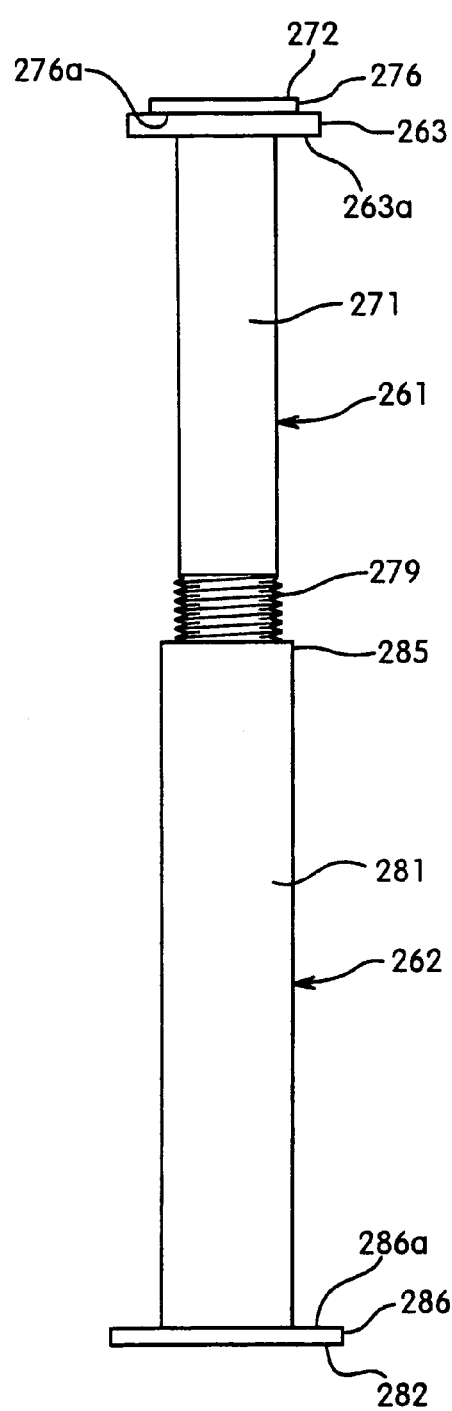
FIG. 10 is a side elevational view of the bicycle headset structure illustrated in FIG. 9 in accordance with the second embodiment of the present invention.
Figure 11:
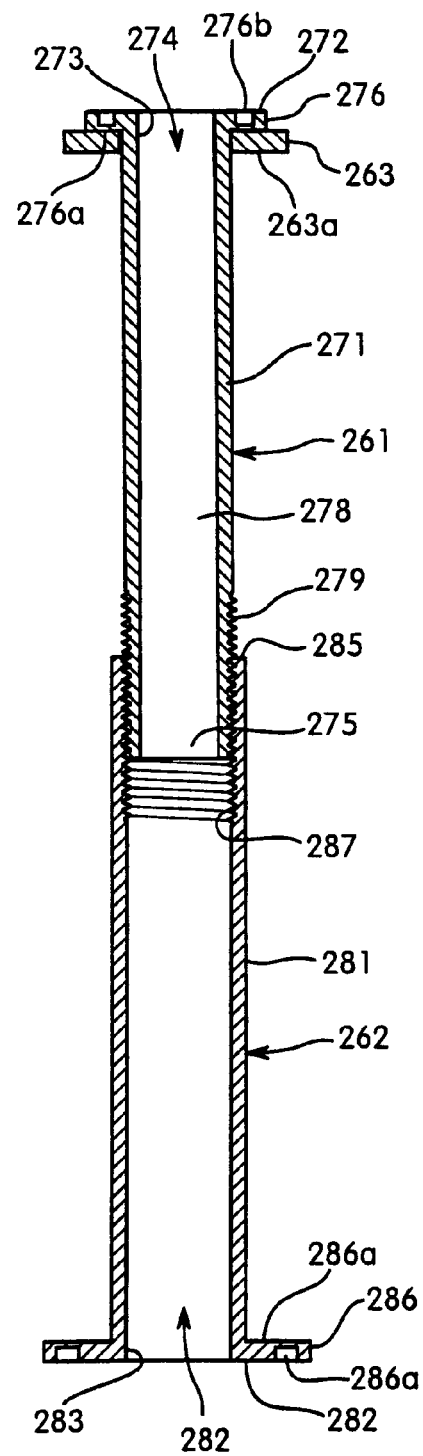
FIG. 11 is a longitudinal cross-sectional view of the bicycle headset structure illustrated in FIG. 10 in accordance with the second embodiment of the present invention.

Turning now to FIGS. 9-11, the bicycle headset structure 211 basically includes an upper tubular member 261, a lower tubular member 262, and an upper washer or abutment member 263. In this embodiment, the bicycle headset structure 211 also includes a pair of spacers or washers 264 that located on the steerer tube 18a between the mounting portion 17a of the handlebar 17 and the upper steering bearing set 20a of the headset 20.

Figure 12:
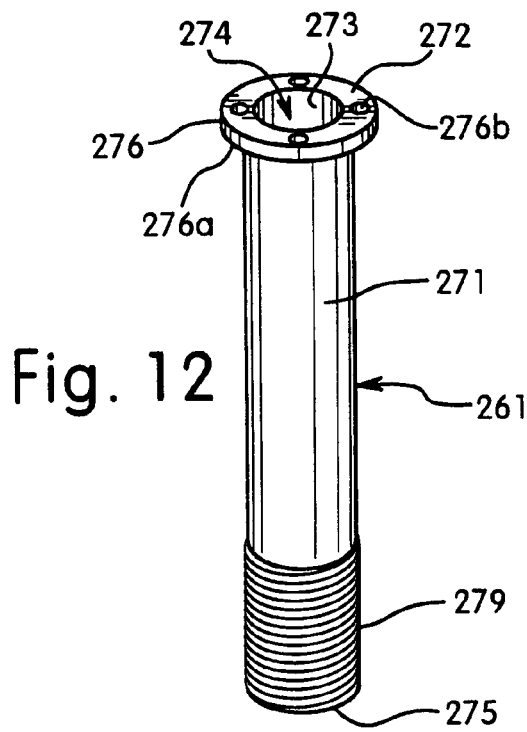
FIG. 12 is a perspective view of the first (top) tubular member or spacer of the bicycle headset structure illustrated in FIGS. 10 and 11 in accordance with the second embodiment of the present invention.
Figure 14:
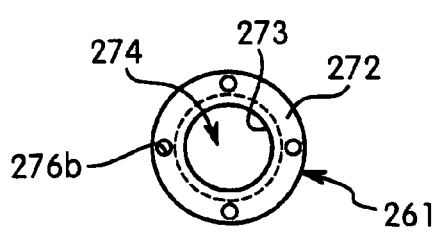
FIG. 14 is a bottom plan view of the first (top) tubular member illustrated in FIG. 12 for the bicycle headset structure illustrated in FIGS. 10 and 11 in accordance with the second embodiment of the present invention.
Figure 13:
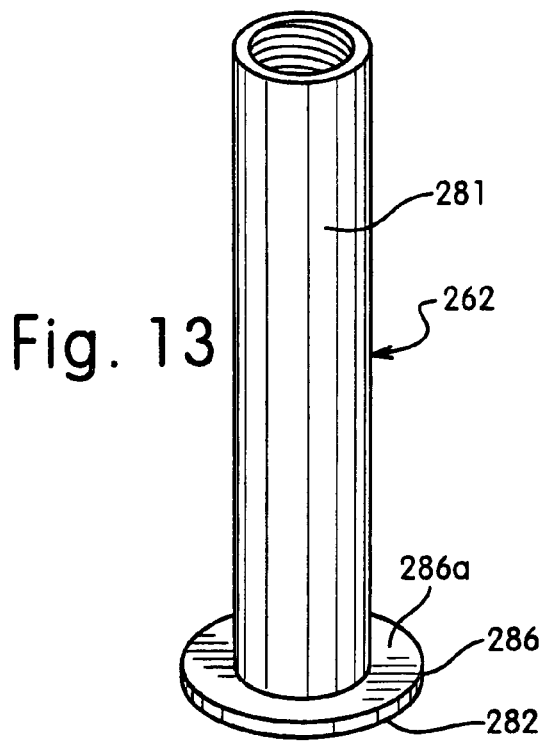
FIG. 13 is a top plan view of the first (top) tubular member illustrated in FIG. 12 for the bicycle headset structure illustrated in FIGS. 10 and 11 in accordance with the second embodiment of the present invention.

As seen in FIGS. 12-14, the upper tubular member 261 is preferably constructed as a one-piece, unitary member from a hard rigid material. More preferably, the upper tubular member 261 is constructed of a metallic material that is especially suitable for bicycles. The upper tubular member 261 basically includes a tubular section 271 having a first end 272 with an upper end opening 273, and an axial passageway 274 extending axially from the first end 272 towards a second end 275 of the tubular section 271. The first end 272 of the tubular section 271 has an annular flange 276 that extends radially outwardly from the tubular section 271. Also the upper washer or abutment member 263 is substantially annularly arranged about the first end 272 of the tubular section 271. Preferably, the annular flange 276 is a continuous annular flange that has an abutment surface 276a and a plurality of tool engagement apertures 276b. The abutment surface 276a is an axially facing surface that faces toward the second end 275 of the tubular section 271. The abutment surface 276a of the annular flange 276 contacts and retains the upper washer or abutment member 263 on the first end 272 of the tubular section 271. Thus, the inner hole of the upper washer 263 is dimensioned to slide over the second end 275 of the tubular section 271 and abut the abutment surface 276a of the annular flange 276 on the first end 272 of the tubular section 271. The outer diameter of the upper washer 263 is dimensioned to contact the mounting portion 17a of the handlebar 17 to exert a downward pressure or force on the mounting portion 17a of the handlebar 17 when the bicycle headset structure 211 is tightened.

Accordingly, the annular flange 276 together with the upper washer 263 are configured and arranged to form a top abutment section of the bicycle headset structure 211 which extends radially from the tubular section 271 to form an abutment surface 263a that faces in an axial direction-towards the second end 275 of the tubular section 271. Preferably, the abutment surface 263a is substantially annularly arranged about the first end 272 of the tubular section 271. In other words, the abutment surface 263a is preferably a continuous annular flange. Of course, it will be apparent to those skilled in the art from this disclosure that the abutment surface 263a can be a discontinuous annular flange.

The tubular section 271, except for the annular flange 276, has an outer width or diameter that is sized to be received with in the passageway of the steerer tube 18a. The annular flange 276, on the other hand, has an outer width or diameter that is sized to be larger than the outer width or diameter of the steerer tube 18a. Preferably, the tubular section 271 is sized such that the passageway of the steerer tube 18a is not substantially reduced.

The second end 275 of the tubular section 271 has a lower end opening 277 such that the axial passageway 274 of the tubular section 271 is a clear and unobstructed passageway extending completely through the tubular section 271. This axial passageway 274 of the tubular section 271 forms a device receiving space 278 or a wiring passageway. The second end 275 of the tubular section 271 also has a set of first (external) threads 279 that threadedly engages the lower tubular member 262 as explained below.

Figure 15:
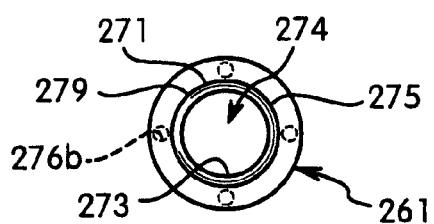
FIG. 15 is a perspective view of the second (bottom) tubular member or spacer of the bicycle headset structure illustrated in FIGS. 10 and 11 in accordance with the second embodiment of the present invention.
Figure 16:
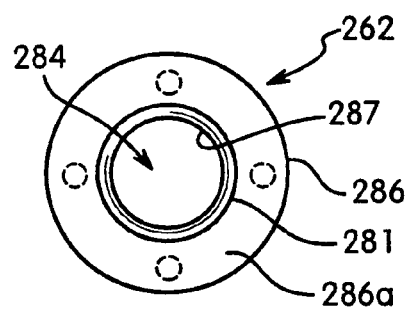
FIG. 16 is a top plan view of the second (bottom) tubular member illustrated in FIG. 15 for the bicycle headset structure illustrated in FIGS. 10 and 11 in accordance with the second embodiment of the present invention.
Figure 17:
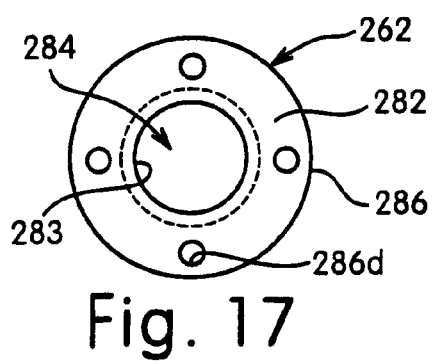
FIG. 17 is a bottom plan view of the second (bottom) tubular member illustrated in FIG. 15 for the bicycle headset structure illustrated in FIGS. 10 and 11 in accordance with the second embodiment of the present invention.

As seen in FIGS. 15-17, the lower tubular member 262 is preferably constructed as a one-piece, unitary member from a hard rigid material. More preferably, the lower tubular member 262 is constructed of a metallic material that is especially suitable for bicycles. The lower tubular member 262 basically includes a tubular section 281 having a first end 282 with an upper end opening 283, and an axial passageway 284 extending axially from the first end 282 towards a second end 285 of the tubular section 281.

The first end 282 of the tubular section 281 has an annular flange 286 that extends radially outwardly from the tubular section 281. Preferably, the annular flange 286 is a continuous annular flange that has an abutment surface 286a and a plurality of tool engagement apertures 286b. The abutment surface 286a is an axially facing surface that faces toward the second end 285 of the tubular section 281. The abutment surface 286a of the annular flange 286 contacts and applies an upward force on the lower surface of the upper crown 18c of the front suspension fork 18 to hold the steerer tube 18a within the bicycle head tube 12d when the bicycle headset structure 211 is installed. Thus, the outer diameter of the annular flange 286 is dimensioned to contact the lower surface of the upper crown 18c to exert an upward force pressure or force when the bicycle headset structure 211 is tightened.

The second end 285 of the tubular section 281 has a set of second (internal) threads 287 form in the axial passageway 284 of the lower tubular member 262. The second threads 287 are threadedly engaged with the first threads 279 of the second end 275 of the upper tubular member 261. Thus, relative rotation between the upper and lower tubular members 261 and 262 causes the annular flanges 276 and 286 of the upper and lower tubular members 261 and 262 to move axially together or axially apart.

When the upper and lower tubular members 261 and 262 are rotated (tightened) to cause the annular flanges 276 and 286 of the upper and lower tubular members 261 and 262 to move axially together, the annular flanges 276 and 286 applies a compressive axial force on the mounting portion 17a of the handlebar 17 and the lower surface of the upper crown 18c. In other words, the annular flanges 276 and 286 are configured and arranged to contract in an axial direction within the steerer tube 18a to apply an axial force to the headset 20 and secure the steerer tube 18a of the front suspension fork 18 within the head tube 12d. Thus, this axial force on the headset 20 allows the used to apply to appropriate load to the upper and lower steering bearing sets 20a and 20b.

The lower tubular member 262 forms a steerer tube attachment section of the bicycle headset structure 211, with the abutment surface 286a being a lower abutment of the steerer tube attachment section. Thus, the steerer tube attachment section is configured and arranged to adjustably couple the tubular sections 271 and 281 to the steerer tube 18a such that selective adjustment of the steerer tube attachment sections results in the abutment surfaces 276a and 286a applying oppositely directed forces on the bicycle head tube 12d to hold the steerer tube 18a within the bicycle head tube 12d.

Third Embodiment

Referring now to FIGS. 18-26, a bicycle headset structure 311 in accordance with a third embodiment will now be explained. The bicycle headset structure 311 is installed on the steerer tube 18a of the front suspension fork 18 of the bicycle 10. In other words, the bicycle headset structure 311 replaces the bicycle headset structure 11. Accordingly, in this third embodiment of the present invention, the bicycle headset structure 311 is mounted within the steerer tube 18a of the front suspension fork 18 to hold the steerer tube 18a within the bicycle head tube 12d. In particular, the bicycle headset structure 311 is mounted within the steerer tube 18a of the front suspension fork 18 so as to contact the upper surface of the mounting portion 17a of the handlebar 17 and the lower surface of the upper crown 18c of the front suspension fork 18. Before the mounting portion 17a of the handlebar 17 is fixedly clamped (i.e., loosely installed) to the steerer tube 18a, the bicycle headset structure 311 is adjusted to apply an axial force that pulls the mounting portion 17a of the handlebar 17 and the front suspension fork 18 together to load the headset 20. In particular, the bicycle headset structure 311 is configured and arranged to contract in an axial direction on the steerer tube 18a to apply an axial force to the headset 20 and secure the steerer tube 18a of the front suspension fork 18 within the head tube 12d. Thus, the bicycle headset structure 311 is configured and arranged to exert a downward pressure or force on the mounting portion 17a of the handlebar 17 which in turn exert a downward pressure or axial force of the upper and lower steering bearing sets 20a and 20b. This axial force on the headset 20 allows the user to apply to appropriate load to the upper and lower steering bearing sets 20a and 20b.

Figure 18:
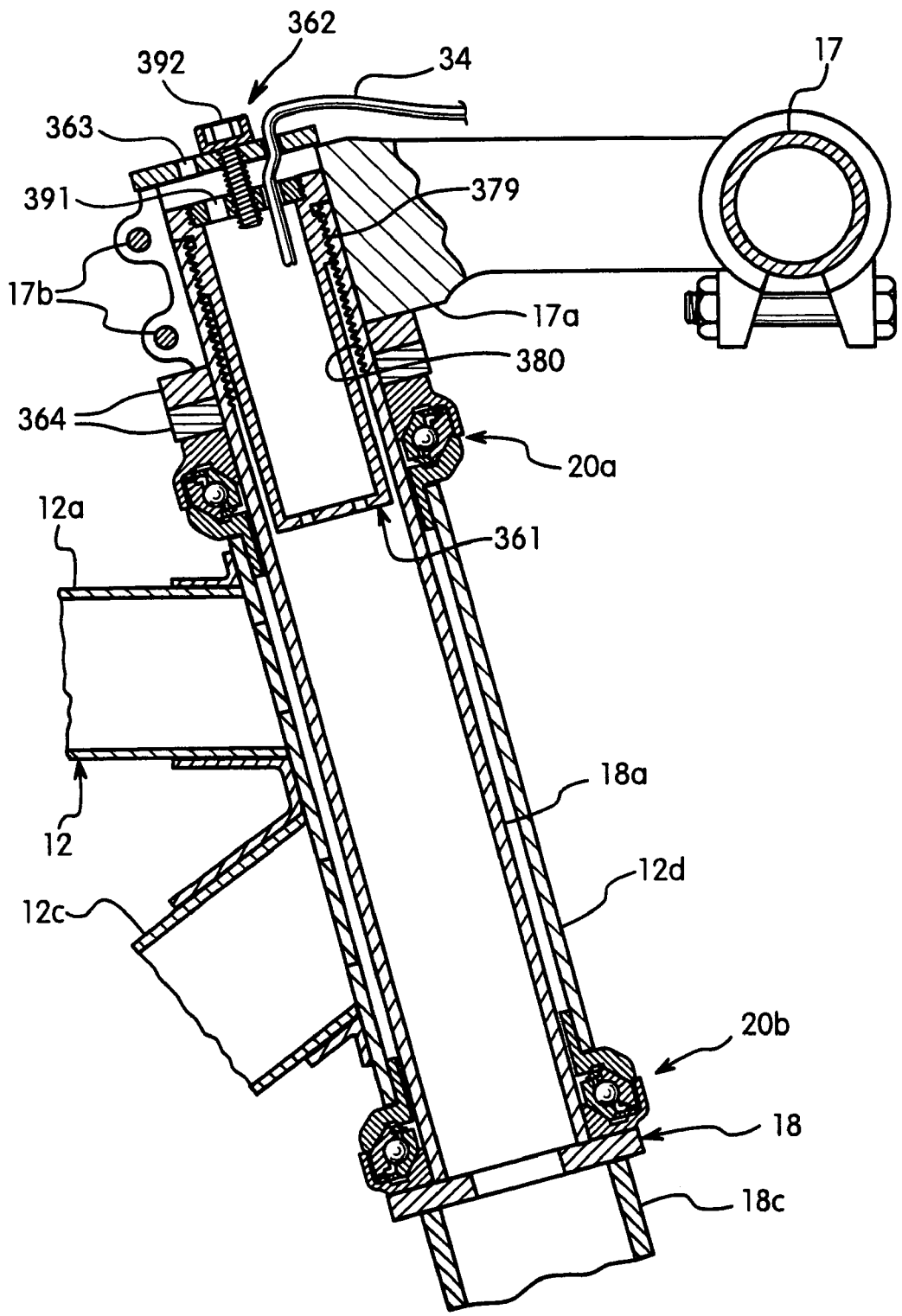
FIG. 18 is a partial enlarged side cross-sectional view of a top portion of the front suspension fork illustrated in FIG. 1 with the bicycle headset structure installed thereon in accordance with a third embodiment of the present invention.
Figure 19:
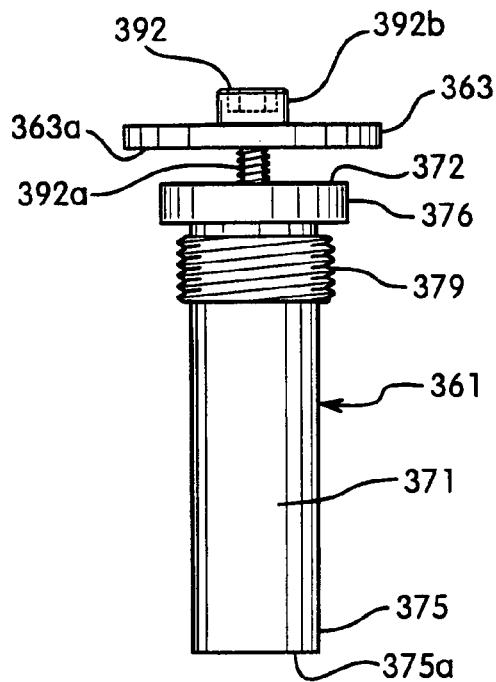
FIG. 19 is a side elevational view of the bicycle headset structure illustrated in FIG. 18 in accordance with the third embodiment of the present invention.
Figure 20:
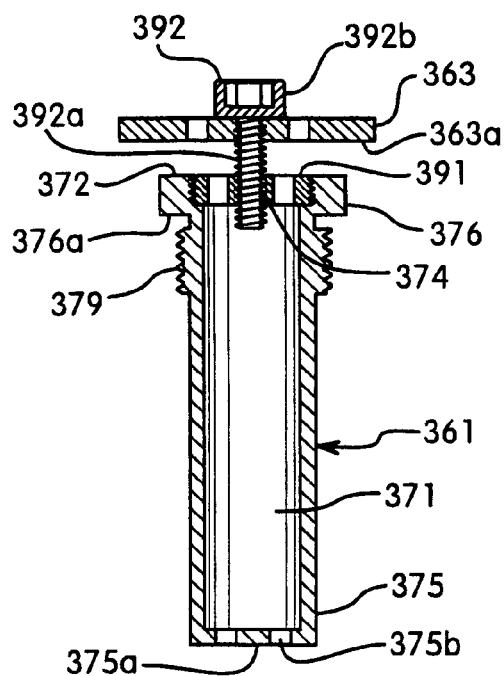
FIG. 20 is a longitudinal cross-sectional view of the bicycle headset structure illustrated in FIG. 19 in accordance with the third embodiment of the present invention.

Turning now to FIGS. 18-20, the bicycle headset structure 311 basically includes an upper tubular member 361, an attachment assembly 362, and an upper washer or abutment member 363. In this embodiment, the bicycle headset structure 311 also includes a pair of spacers or washers 364 that located on the steerer tube 18a between the mounting portion 17a of the handlebar 17 and the upper steering bearing set 20a of the headset 20.

Figure 21:
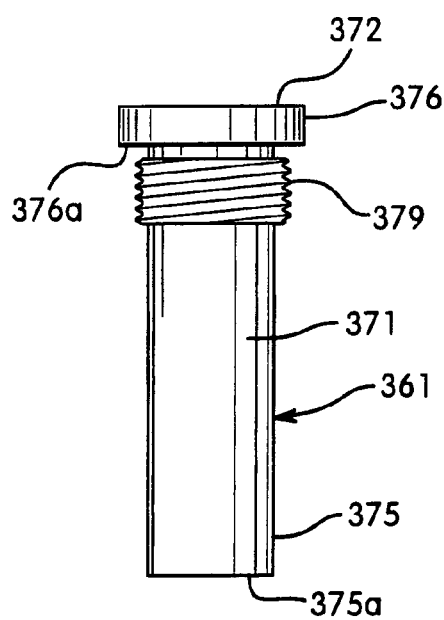
FIG. 21 is a side elevational view of the first (top) tubular member or spacer of the bicycle headset structure illustrated in FIGS. 19 and 20 in accordance with the third embodiment of the present invention.
Figure 22:
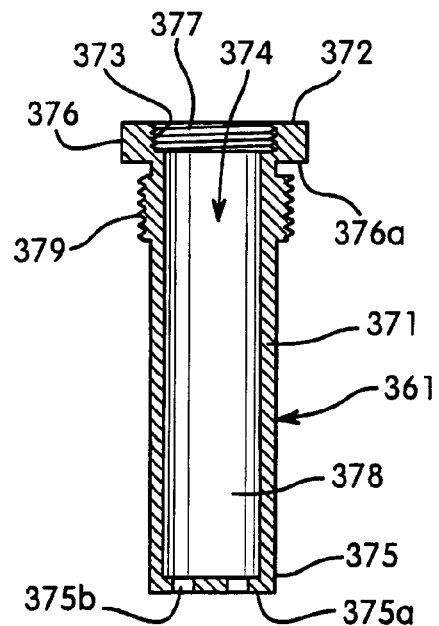
FIG. 22 is a longitudinal cross-sectional view of the first (top) tubular member illustrated in FIG. 21 for the bicycle headset structure illustrated in FIGS. 19 and 20 in accordance with the third embodiment of the present invention.
Figure 23:
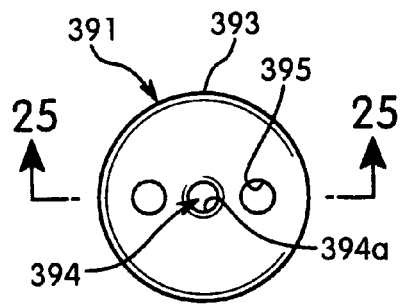
FIG. 23 is a top plan view of the attachment member of the bicycle headset structure illustrated in FIGS. 19 and 20 in accordance with the third embodiment of the present invention.
Figure 24:
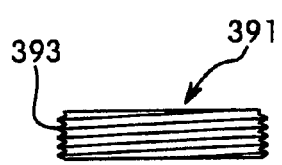
FIG. 24 is a side elevational view of the attachment member illustrated in FIG. 23 for the bicycle headset structure illustrated in FIGS. 19 and 20 in accordance with the third embodiment of the present invention.
Figure 26:
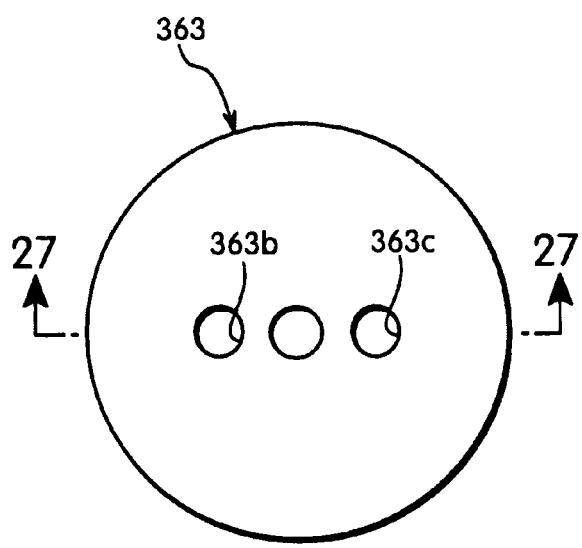
FIG. 26 is a top plan view of the abutment washer or member of the bicycle headset structure illustrated in FIGS. 19 and 20 in accordance with the third embodiment of the present invention.
Figure 25:
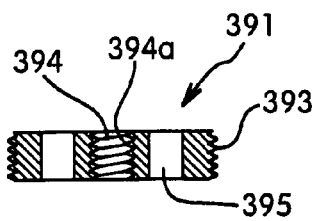
FIG. 25 is a cross-sectional view of the attachment member illustrated in FIGS. 23 and 24 for the bicycle headset structure illustrated in FIGS. 19 and 20 in accordance with the third embodiment of the present invention as seen along section line 25-25 of FIG. 23.

As seen in FIGS. 21 and 22, the upper tubular member 361 is preferably constructed as a one-piece, unitary member from a hard rigid material. More preferably, the upper tubular member 361 is constructed of a metallic material that is especially suitable for bicycles. The upper tubular member 361 basically includes a tubular section 371 having a first end 372 with an upper end opening 373, and an axial passageway 374 extending axially from the first end 372 towards a second end 375 of the tubular section 371. The first end 372 of the tubular section 371 has an annular flange 376 that extends radially outwardly from the tubular section 371. Preferably, the annular flange 376 is a continuous annular flange that has an abutment surface 376a and a plurality of tool engagement apertures such as four blind bores (not shown) that are equally spaced around the annular flange 376.

The upper end opening 373 of the tubular section 371 includes a set of first internal threads 377 for attaching the attachment assembly 362 to the upper tubular member 361. As discussed below, the attachment assembly 362 applies an axially directed force on the upper tubular member 361 which is fixedly coupled to the steerer tube 18a. Thus, by adjusting the attachment assembly 362, the steerer tube 18a is pulled upwardly against the lower steering bearing set 20b and the mounting portion 17a of the handlebar 17 is pushed downwardly to apply an axially direction force on the upper steering bearing set 20a.

The first end 372 of the tubular section 371 includes an outer peripheral surface with a set of first external threads 379 that threadedly engages a set of second internal threads 380 of the steerer tube 18a so that the upper tubular member 361 is fixedly coupled within the steerer tube 18a.

The abutment surface 376a of first end 372 of the tubular section 371 is an axially facing surface that faces toward the second end 375 of the tubular section 371. Thus, the abutment surface 376a of the annular flange 376 contacts the upper end of the steerer tube 18 to limit inward movement of the upper tubular member 361 when the upper tubular member 361 is threaded into the steerer tube 18a.

The tubular section 371, except for the annular flange 376, has an outer width or diameter that is sized to be received with in the passageway of the steerer tube 18a. The annular flange 376, on the other hand, has an outer width or diameter that is sized to be larger than the outer width or diameter of the steerer tube 18a. The tubular section 371 is preferably sized such that the passageway of the steerer tube 18a is not substantially reduced.

The second end 375 of the tubular section 371 has a lower end wall 375a that is axially spaced from the upper end opening 373 along the axial passageway 374 of the tubular section 371 to form a device receiving space 378. Optionally, the lower end wall 375a has one or more apertures 357b for one or more wires to extend therethrough.

As seen in FIGS. 18-20, the attachment assembly 362 basically includes an attachment member 391 and an adjustment bolt 392 that is adjustably coupled to the attachment member 391. The attachment member 391 and an adjustment bolt 392 form the steerer tube attachment section of the bicycle headset structure 311. The abutment washer or member 363 is mounted on the adjustment bolt 392 such that adjustment of the attachment assembly 362 varies the axially directed force of the abutment washer or member 363 on the mounting portion 17a of the handlebar 17. The attachment member 391 and the adjustment bolt 392 are each preferably constructed as a one-piece, unitary member from a hard rigid material. More preferably, the attachment member 391 and the adjustment bolt 392 are each preferably constructed of a metallic material suitable that is particularly suitable for bicycles.

As seen in FIGS. 18 and 20, the attachment member 391 is threadedly coupled to the upper end opening 373 of the tubular section 371 for adjustably attaching the attachment assembly 362 to the upper tubular member 361. In particular, the attachment member 391 has an outer peripheral surface with a set of second external threads 393 that are threadedly engaged with the first internal threads 377 of the upper end opening 373 of the tubular section 371 for attaching the attachment assembly 362 to the upper tubular member 361. The attachment member 391 also has a center threaded bore 394 with a set of second internal threads 394a that are threadedly engaged with the adjustment bolt 392. Preferably, the attachment member 391 has at least one hole 395 that communicates with the axial passageway 374 of the tubular section 371.

As seen in FIGS. 18-20, the adjustment bolt 392 has a threaded shaft portion 392a with a set of external threads and a head portion 392b located at the upper end of the threaded shaft portion 392a. The abutment washer or member 363 is slideably mounted on the threaded shaft portion 392a and abuts against the head portion 392b when the bicycle headset structure 311 is assembled. Thus, rotation of the adjustment bolt 392 applies an axially directed force on the upper tubular member 361 which is fixedly coupled to the steerer tube 18a. In other words, by threaded the adjustment bolt 392 into the threaded bore 394, the steerer tube 18a is pulled upwardly against the lower steering bearing set 20b and the mounting portion 17a of the handlebar 17 is pushed downwardly by the to apply an axially direction force on the upper steering bearing set 20a.

As seen in FIGS. 18-20 and 26, the abutment member 363 is preferably constructed as a one-piece, unitary member from a hard rigid material. More preferably, the abutment member 363 is constructed of a metallic material that is especially suitable for bicycles. The abutment member 363 is basically a disc shaped member that forms an abutment surface 363a. In other words, the outer diameter of the abutment surface 363a of the abutment member 363 is dimensioned to contact the mounting portion 17a of the handlebar 17 to exert a downward pressure or force on the mounting portion 17a of the handlebar 17 when the bicycle headset structure 311 is tightened.

The abutment member 363 has a center hole 363b for receiving the adjustment bolt 392 therethrough. Preferably, the abutment member 363 has at least one hole 363c that communicates with the axial passageway 374 of the tubular section 371. Thus, one or more electrical cords can pass into the device receiving space 378 by feeding one or more electrical cords through the hole 363c of the abutment member 363 and through one of the holes 395 of the attachment member 391.

Accordingly, the abutment member 363 is configured and arranged to form a top abutment section of the bicycle headset structure 311 which extends radially from the tubular section 376 to form the abutment surface 363a that faces in an axial direction towards the second end 375 of the tubular section 371. Preferably, the abutment surface 363a is substantially annularly arranged about the first end 372 of the tubular section 371. In other words, the abutment surface 363a is preferably a continuous annular flange. Of course, it will be apparent to those skilled in the art from this disclosure that the abutment surface 363a can be a discontinuous annular flange.

Fourth Embodiment

Figure 27:
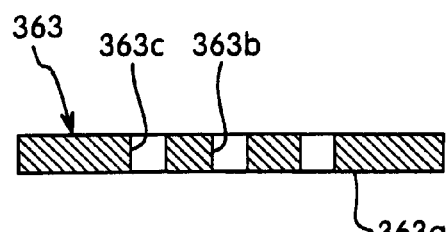
FIG. 27 is a cross-sectional view of the abutment washer or member illustrated in FIG. 26 for the bicycle headset structure illustrated in FIGS. 19 and 20 in accordance with the third embodiment of the present invention as seen along section line 27-27 of FIG. 26.

Referring now to FIGS. 27 and 28, a bicycle headset structure 411 in accordance with a fourth embodiment will now be explained. The bicycle headset structure 411 is installed on the steerer tube 18a of the front suspension fork 18 of the bicycle 10. In other words, the bicycle headset structure 411 replaces the bicycle headset structure 11. Accordingly, in this fourth embodiment of the present invention, the bicycle headset structure 411 is mounted within the steerer tube 18a of the front suspension fork 18 to hold the steerer tube 18a within the bicycle head tube 12d. In particular, the bicycle headset structure 411 is mounted within the steerer tube 18a of the front suspension fork 18 so as to contact the upper surface of the mounting portion 17a of the handlebar 17 and the lower surface of the upper crown 18c of the front suspension fork 18. Before the mounting portion 17a of the handlebar 17 is fixedly clamped (i.e., loosely installed) to the steerer tube 18a, the bicycle headset structure 411 is adjusted to apply an axial force that pulls the mounting portion 17a of the handlebar 17 and the front suspension fork 18 together to load the headset 20. In particular, the bicycle headset structure 411 is configured and arranged to contract in an axial direction on the steerer tube 18a to apply an axial force to the headset 20 and secure the steerer tube 18a of the front suspension fork 18 within the head tube 12d. Thus, the bicycle headset structure 411 is configured and arranged to exert a downward pressure or force on the mounting portion 17a of the handlebar 17 which in turn exert a downward pressure or axial force of the upper and lower steering bearing sets 20a and 20b. This axial force on the headset 20 allows the user to apply to appropriate load to the upper and lower steering bearing sets 20a and 20b.

The bicycle headset structure 411 basically includes an upper tubular member 461 and a pair of spacers or washers 462 that located on the steerer tube 18a between the mounting portion 17a of the handlebar 17 and the upper steering bearing set 20a of the headset 20.

The upper tubular member 461 is preferably constructed as a one-piece, unitary member from a hard rigid material. More preferably, the upper tubular member 461 is constructed of a metallic material that is especially suitable for bicycles. The upper tubular member 461 basically includes a tubular section 471 having a first end 472 with an upper end opening 473, and an axial passageway 474 extending axially from the first end 472 towards a second end 475 of the tubular section 471. The first end 472 of the tubular section 471 has an annular flange 476 that extends radially outwardly from the tubular section 471. Preferably, the annular flange 476 is a continuous annular flange that has an abutment surface 476a.

The tubular section 471 includes an outer peripheral surface with a set of first external threads 479 that threadedly engages a set of second internal threads 480 of the steerer tube 18a so that the upper tubular member 461 is fixedly coupled within the steerer tube 18a. The outer peripheral surface with a set of first threads 479 that form the steerer tube attachment section of the bicycle headset structure 411.

The abutment surface 476a of the first end 472 of the tubular section 471 is an axially facing surface that faces toward the second end 475 of the tubular section 471. Thus, the outer width of the abutment surface 476a of the annular flange 476 is dimensioned to contact the mounting portion 17a of the handlebar 17 to exert a downward pressure or force on the mounting portion 17a of the handlebar 17 when the bicycle headset structure 411 is tightened.

Thus, rotation of the upper tubular member 461 applies an axially directed force on the mounting portion 17a of the handlebar 17 which is mounted loosely to the steerer tube 18a when the upper tubular member 461 is initially installed. In other words, by threaded the upper tubular member 461 into the threads 480 of the steerer tube 18a, the steerer tube 18a is pulled upwardly against the lower steering bearing set 20b and the mounting portion 17a of the handlebar 17 is pushed downwardly by the to apply an axially direction force on the upper steering bearing set 20a.

The tubular section 471, except for the annular flange 476, has an outer width or diameter that is sized to be received within the passageway of the steerer tube 18a. The annular flange 476, on the other hand, has an outer width or diameter that is sized to be larger than the outer width or diameter of the steerer tube 18a such that the passageway of the steerer tube 18a is not substantially reduced.

The second end 475 of the tubular section 471 has a lower end opening 475a that communicates with the axial passageway 474 of the tubular section 471 such that a through bore extends completely through the bicycle headset structure 411.

Various Applications

Referring now to FIGS. 30-33, when one of the bicycle headset structures 11, 211 and 411 are used, a device receiving recess is formed to mount one of the bicycle components $C_1$-$C_4$ as shown in FIGS. 30-33. However, for the sake of brevity, the bicycle components $C_1$-$C_4$ as shown in FIGS. 30-33 will only be illustrated with the first embodiment. Of course, the bicycle components $C_1$-$C_4$ can also be used in the second and fourth embodiments by changing the size of the bicycle components $C_1$-$C_4$ to fit in the device receiving recess of the particular embodiment.

Figure 30:
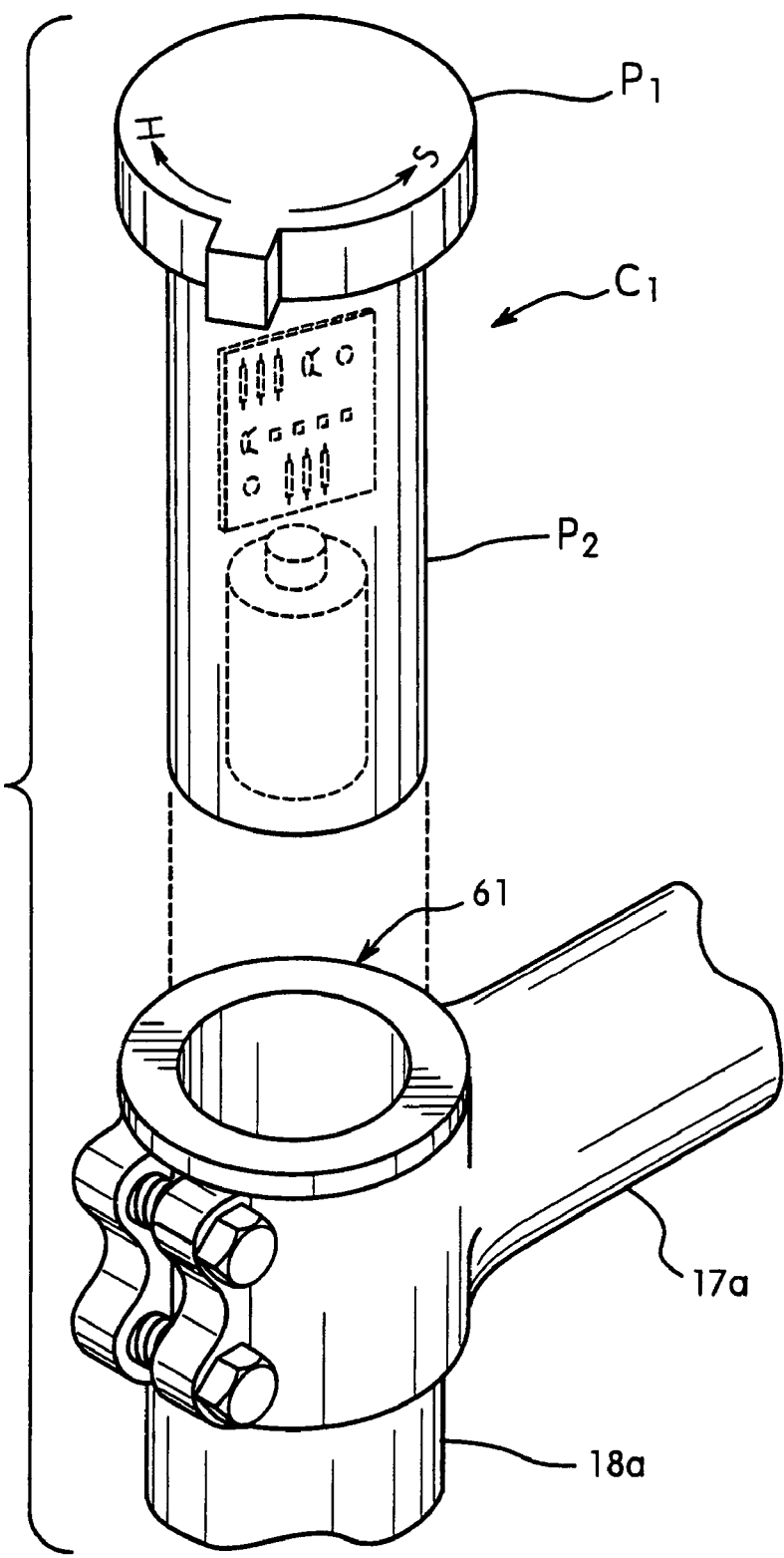
FIG. 30 is a perspective view of an electronic suspension controller mounted in the steerer tube an alternate application in accordance with the present invention.

As seen in FIG. 30, the bicycle component $C_1$ is an electronic suspension controller, i.e., an electrical device, which has an operator using portion $P_1$ and a steerer tube insertion portion $P_2$. A printed circuit board and a battery are located inside the steerer tube insertion portion $P_2$. The operator using portion $P_1$ has an outermost width that is larger than inner diameter of the upper tubular member 461, while the steerer tube insertion portion $P_2$ has an outermost width that is smaller than inner diameter of the upper tubular member 461. Thus, the electrical switch $C_1$ can be inserted into the passageway of the upper tubular member 461. The precise structure of the electronic suspension controller $C_1$ is not important to the present invention. Thus, the precise structure of the electronic suspension controller $C_1$ will not be discussed or illustrated in detail herein.

Figure 31:
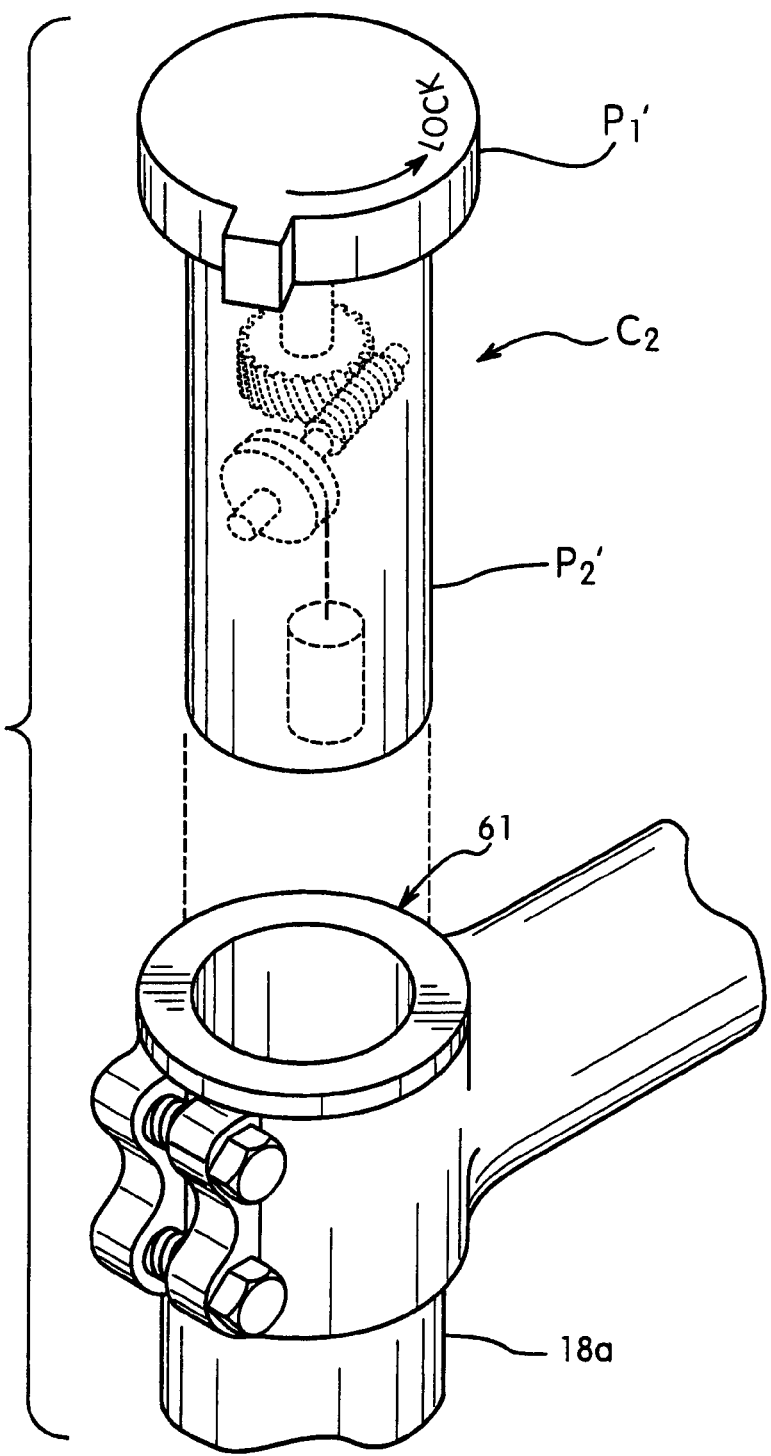
FIG. 31 is a perspective view of a mechanical suspension controller mounted in the steerer tube an alternate application in accordance with the present invention.

As seen in FIG. 31, the bicycle component $C_2$ is a mechanical suspension controller, i.e., a cable operating device, which has an operator using portion $P_1'$ and a steerer tube insertion portion $P_2'$. A cable winding mechanism is located inside the steerer tube insertion portion $P_2'$ for winding an inner wire of a cable in response to rotation of the operator using portion $P_1'$. The operator using portion $P_1'$ has an outermost width that is larger than inner diameter of the upper tubular member 461, while the steerer tube insertion portion $P_2'$ has an outermost width that is smaller than inner diameter of the upper tubular member 461. Thus, the mechanical suspension controller $C_2$ can be inserted into the passageway of the upper tubular member 461. The precise structure of the mechanical suspension controller $C_2$ is not important to the present invention. Thus, the precise structure of the mechanical suspension controller $C_2$ will not be discussed or illustrated in detail herein.

Figure 32:
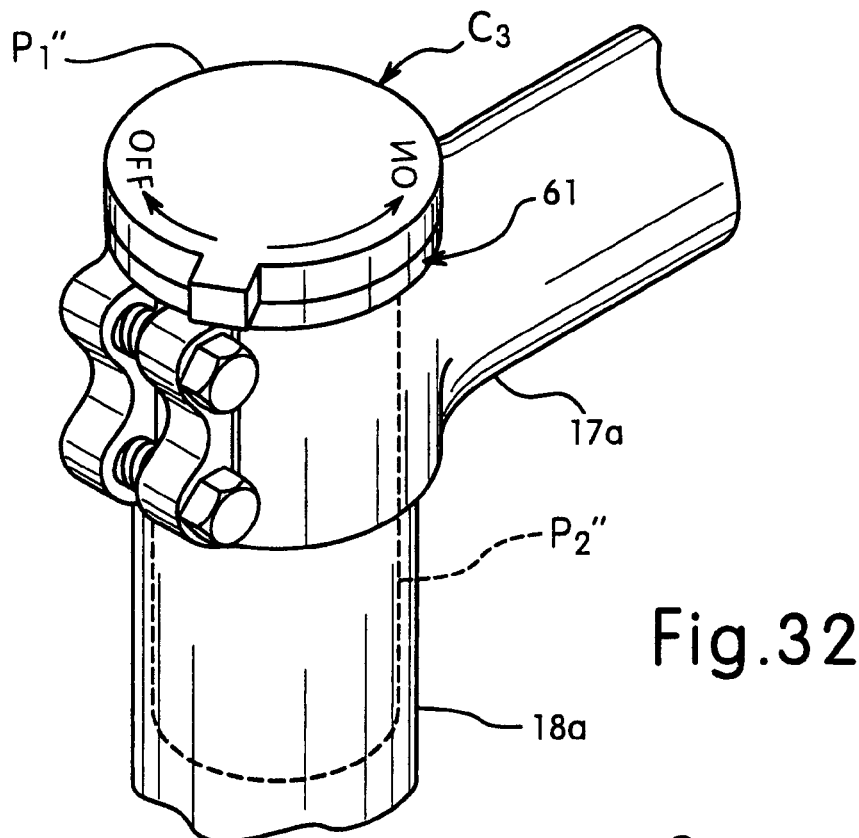
FIG. 32 is a perspective view of a lamp switch mounted in the steerer tube an alternate application in accordance with the present invention.

As seen in FIG. 32, the bicycle component $C_3$ is an electrical switch, i.e., an electrical device, which has an operator using portion $P_1'''$ and a steerer tube insertion portion $P_2'''$. Electrical contacts are located inside the steerer tube insertion portion $P_2'''$ for turning on and off an electrical component of the bicycle such as a lamp in response to rotation of the operator using portion $P_1'''$. The operator using portion $P_1'''$ has an outermost width that is larger than inner diameter of the upper tubular member 461, while the steerer tube insertion portion $P_2'''$ has an outermost width that is smaller than inner diameter of the upper tubular member 461. Thus, the electrical switch $C_3$ can be inserted into the passageway of the upper tubular member 461. The precise structure of the electrical switch $C_3$ is not important to the present invention. Thus, the precise structure of the electrical switch $C_3$ will not be discussed or illustrated in detail herein.

Figure 33:
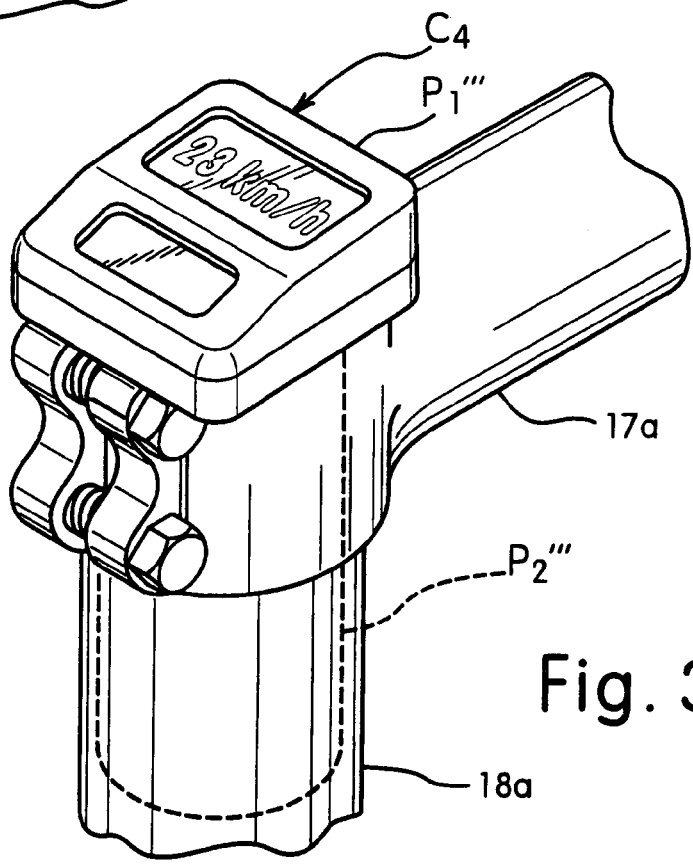
FIG. 33 is a perspective view of a cycle computer or controller mounted in the steerer tube an alternate application in accordance with the present invention.

As seen in FIG. 33, the bicycle component $C_4$ is a cycle computer with a display, i.e., an electrical device, which has an operator using portion $P_1''''$ such as push buttons and a steerer tube insertion portion $P_2''''$. Various electrical parts are located inside the steerer tube insertion portion $P_2''''$ for operating an electrical component of the bicycle and/or displaying information in response to input signals from sensors. The operator using portion $P_1''''$ has an outermost width that is larger than inner diameter of the upper tubular member 461, while the steerer tube insertion portion $P_2''''$ has an outermost width that is smaller than inner diameter of the upper tubular member 461. Thus, the cycle computer $C_4$ replaces the cycle computer 31 and can be inserted into the passageway of the upper tubular member 461. The precise structure of the cycle computer $C_4$ is not important to the present invention. Thus, the precise structure of the cycle computer $C_4$ will not be discussed or illustrated in detail herein.

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be appatent to those skilled in the art from this disclosure that various changes and modifications can be made herein without departing from the scope of the invention as defined in the appended claims. Furhermore, the foregoing descriptions of the embodiments according to the present invention are provided for illustration only, and not for the purpose of limiting the invention as defined by the appended claims and their equivalents.

What is claimed is:

1. A bicycle headset structure comprising:
    a tubular section having a first end with an upper end opening, a second end, and an axial passageway extending axially from the first end towards the second end of the tubular section, the second end having a lower end wall that is axially spaced from the upper end opening along the axial passageway, the lower end wall forming an internally threaded hole and at least one opening for one or more wires to extend through the lower end wall, the tubular section being a one-piece, unitary member;
    a top abutment section extending radially from the tubular section to form an abutment surface that faces in an axial direction towards the second end of the tubular section; and
    a steerer tube attachment section adjustably coupled to the internally threaded hole of the tubular section, the steerer tube attachment section including an abutment member arranged below the second end of the tubular section, wherein the abutment member being external of a steerer tube so as to contact a lower surface of a front suspension fork, such that selective adjustment of the steerer tube attachment section results in the abutment surface and the abutment member changing oppositely directed forces applied to a bicycle head tube when the abutment surface and the abutment member are axially adjusted relative to each other due to the selective adjustment of the steerer tube attachment section, the steerer tube attachment section and the tubular section being configured to form a continuous access passage extending from the upper end opening to the abutment member.

2. The bicycle headset structure according to claim 1, further comprising a bicycle component at least partially disposed within the tubular section.

3. A bicycle headset structure comprising:

a tubular section having a first end with an upper end opening, and an axial passageway extending axially from the first end towards a second end of the tubular section, the tubular section being a one-piece unitary member, the second end of the tubular section including a set of first threads and at least one opening formed separate from the first threads for one or more wires to extend through the second end;

a top abutment section extending radially from the tubular section to form an abutment surface that faces in an axial direction towards the second end of the tubular section; and a steerer tube.attachment section including a set of second threads that are threadedly engaged with the first threads to adjustably couple the tubular section to a steerer tube via an abutment member arranged below the second end of the tubular section, wherein the abutment member being external of the steerer tube so as to contact a lower surface of a front suspension fork, such that selective adjustment of the steerer tube attachment section results in the abutment surface and the abutment member changing oppositely directed forces applied to a bicycle head tube when the abutment surface and the abutment member are axially adjusted relative to each other due to the selective adjustment of the steerer tube attachment section, the steerer tube attachment section and the tubular section being configured to form a continuous access passage extending from the upper end opening to the abutment member.

4. The bicycle headset structure according to claim 3, wherein the first threads of the tubular section are internal threads, and the steerer tube attachment section includes a threaded bolt that has a head portion and a threaded shaft portion with the second threads.

5. The bicycle headset structure according to claim 4, wherein the abutment member has a radial width that is larger than a radial width of the tubular section.

6. The bicycle headset structure according to claim 5, wherein the abutment surface is substantially annularly arranged about the first end of the tubular section.

7. The bicycle headset structure according to claim 6, wherein the abutment surface is a continuous annular flange.

8. A bicycle headset structure comprising:

a tubular section having a first end with an upper end opening, a second end, and an axial passageway extending axially from the first end towards the second end of the tubular section, the second end having a lower end wall disposed substantially perpendicular to the axial passageway to form a device receiving space in the tubular section, the tubular section being a one-piece, unitary member;

a top abutment section extending radially from the tubular section to form an abutment surface that faces in an axial direction towards the second end of the tubular section;

a steerer tube attachment section configured and arranged to adjustably couple the tubular section to a steerer tube via an abutment member such that selective adjustment of the steerer tube attachment section results in the abutment surface and the abutment member applying oppositely directed forces to a bicycle head tube to hold the steerer tube within the bicycle head tube; and a bicycle component at least partially disposed within the device receiving space, the bicycle component being selected from the group consisting of an electrical device, a cable operating device, a suspension controller, an electrical switch and a display, the bicycle component including an operator using portion exposed to a user, and a steerer tube insertion portion disposed within the tubular section, the steerer tube attachment section and the tubular section being configured to form a continuous access passage extending from the upper end opening to the abutment member, the abutment member being external of the steerer tube so as to contact a lower surface of a front suspension fork.

9. A bicycle headset structure comprising:

a tubular section having a first end with an upper end opening, and an axial passageway extending axially from the first end towards a second end of the tubular section, the second end of the tubular section including a set of first internal threads;

a top abutment section extending radially from the tubular section to form an abutment surface that faces in an axial direction towards the second end of the tubular section; and a steerer tube attachment section configured and arranged to adjustably couple the tubular section to a steerer tube, wherein the abutment member being external of the steerer tube so as to contact a lower surface of a front suspension fork, such that selective adjustment of the steerer tube attachment section results in a change in a downward force that the abutment surface applies on a bicycle head tube, the steerer tube attachment section including a threaded bolt and the abutment member, the threaded bolt having a head portion arranged below the first internal threads and a threaded portion with a set of second threads that are threadedly engaged with the first internal threads, abutment member having a radial width that is larger than a maximum radial width of the tubular section, the head portion of the bolt having a radial width that is larger than a radial width of the threaded portion and smaller than the radial width of the abutment member.

10. The bicycle headset structure according to claim 9, wherein the abutment surface is substantially annularly arranged about the first end of the tubular section.

11. The bicycle headset structure according to claim 10, wherein the abutment surface is a continuous annular flange.

12. A bicycle headset structure comprising:

a tubular section having a first end with an upper end opening, and an axial passageway extending axially from the first end towards a second end of the tubular section, the tubular section being a one-piece, unitary member;

a top abutment section extending radially from the tubular section to form an abutment surface that faces in an axial direction towards the second end of the tubular section;

a steerer tube attachment section configured and arranged to adjustably couple the tubular section to a steerer tube via an abutment member such that selective adjustment of the steerer tube attachment section results in the abutment surface applying a downward force on a bicycle head tube to hold the steerer tube within the bicycle head tube, the abutment member being external of the steerer tube so as to contact a lower surface of a front suspension fork;

a steerer tube insertion portion disposed within the tubular section; and a bicycle component at least partially disposed within the tubular section, the bicycle component having an operator using portion exposed to a user and being selected from the group consisting of an electrical device, an electrical switch and a display.

* * * * *